(12) United States Patent
Stark et al.

(10) Patent No.: US 10,959,058 B1
(45) Date of Patent: Mar. 23, 2021

(54) OBJECT TRACKING SYSTEMS AND METHODS

(71) Applicant: Stark Industries, Inc., Clarksville, TN (US)

(72) Inventors: Atlas Tony Stark, Clarksville, TN (US); Charles Bradford Workman, Clarksville, TN (US)

(73) Assignee: STARK INDUSTRIES, INC., Clarksville, TN (US)

( * ) Notice: Subject to any disclaimer, the term of this patent is extended or adjusted under 35 U.S.C. 154(b) by 0 days.

(21) Appl. No.: 17/112,334

(22) Filed: Dec. 4, 2020

Related U.S. Application Data

(63) Continuation-in-part of application No. 16/774,227, filed on Jan. 28, 2020.

(51) Int. Cl.
| | | |
|---|---|---|
| *G08B 1/08* | (2006.01) | |
| *H04W 4/029* | (2018.01) | |
| *H04W 84/18* | (2009.01) | |
| *G01S 19/18* | (2010.01) | |
| *G08B 21/04* | (2006.01) | |
| *G01S 19/17* | (2010.01) | |
| *G08B 6/00* | (2006.01) | |

(52) U.S. Cl.
CPC ............ *H04W 4/029* (2018.02); *G01S 19/17* (2013.01); *G01S 19/18* (2013.01); *G08B 6/00* (2013.01); *G08B 21/0453* (2013.01); *H04W 84/18* (2013.01)

(58) Field of Classification Search
CPC ........ H04W 4/029; H04W 84/18; G08B 6/00; G08B 21/0453; G01S 19/17; G01S 19/18
See application file for complete search history.

(56) References Cited

U.S. PATENT DOCUMENTS

| | | | |
|---|---|---|---|
| 10,708,722 B1 * | 7/2020 | Klinkner | ............... G01S 5/0295 |
| 2005/0136912 A1 * | 6/2005 | Curatolo | ............ G08B 21/0227 |
| | | | 455/423 |
| 2016/0044451 A1 * | 2/2016 | Marth | .................... H04W 4/029 |
| | | | 340/8.1 |
| 2017/0352250 A1 * | 12/2017 | de Barros Chapiewski | ............... |
| | | | H04W 4/021 |

\* cited by examiner

*Primary Examiner* — Phung Nguyen
(74) *Attorney, Agent, or Firm* — Eversheds Sutherland (US) LLP

(57) ABSTRACT

Systems, methods, and computer-readable media are disclosed for object tracking. An example method may include receiving satellite signals from GPS satellites. The satellite signals may be indicative of satellite locations associated with the one or more GPS satellites and satellite timestamps associated with respective satellite locations. The method may further include determining, based on the satellite signals, a first location associated with a first tracking device. The method may further include receiving a target location associated with a target via a satellite transmission. The method may further include sending the target location to a second tracking device via a mesh network. The method may further include determining that a first distance between the first location and the target location, and the method may further include determining, based on the first distance, one or more actions.

20 Claims, 13 Drawing Sheets

OBJECT TRACKING SYSTEMS AND METHODS

CROSS-REFERENCE TO RELATED APPLICATION

This application is a continuation-in-part of U.S. application Ser. No. 16/774,227, filed Jan. 28, 2020, the entirety of which is hereby incorporated by reference.

BACKGROUND

Current tracking systems may be designed to locate an object (e.g., a person, a pet, an electronic device, a vehicle, etc.) from the air using sensors (e.g., Global Positioning System (GPS), transponders, ultra wideband locating systems, etc.). However, more accurate and secure tracking systems may be needed to enable positive identification of specific objects. For example, law enforcement may need more accurate tracking technology for identifying specific individuals from aircraft, drones and other surveillance vehicles. Moreover, parents and pet owners may need more accurate and secure tracking technology to enable close tracking of children and pets, to avoid malicious persons locating children and pets.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
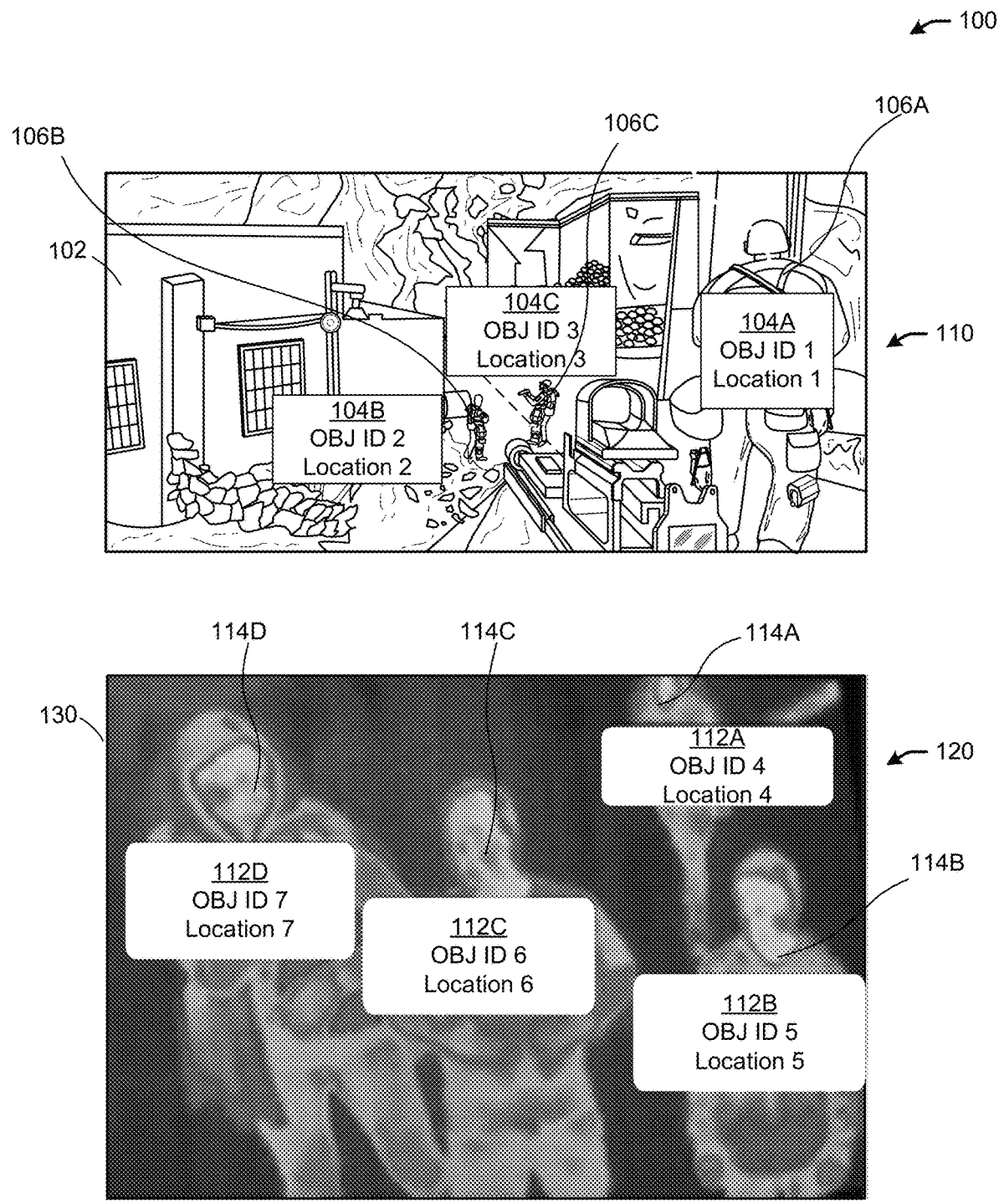
FIG. 1A is a schematic diagram of an example use case illustrating object trackers in combination with infrared imaging and thermal imaging in accordance with one or more example embodiments of the disclosure.

This disclosure relates to, among other things, systems, methods, computer-readable media, techniques, and methodologies for object (e.g., an individual or asset) tracking to provide highly accurate and secure location and time information based on an object tracking system. An object tracking system may positively identify individual objects (e.g., officers, soldiers, children, pets, devices, or any other suitable individuals and assets). The object tracking system may track precise locations using geographic coordinates, and may record and/or display the locations (e.g., in real-time, or in substantially real-time). The object tracking system may store location data and time data, which can be used to generate footpath data for various objects and/or individuals. Location data may include geographic coordinates, as well as optional altitude information. The object tracking system may determine biometric data (e.g., a pulse rate, a respiration rate, a temperature, etc.) for an object (e.g., a person, or a pet) in contact with, or otherwise associated with, a particular object tracker. Biometric data may be used to automatically trigger one or more actions. For example, if a certain biometric indicator is lower than a safety threshold (e.g., a person loses consciousness, has a heart rate or pulse rate below or more than a threshold, etc.) or a button of the object tracking system is manually pressed, the object tracking system may emit an locating strobe for assistance. Data obtained from the object tracking system may be time-and-date-stamped for activity verification. Components of the object tracking system may securely communicate with each other via satellite transmissions (e.g., via standard Iridium-platform satellites and transmission modules, or any other suitable satellite providers), bypassing the internet, with fail-safe operation due to instant failover utilizing cellular and/or Bluetooth during intermittent signal interruptions or a satellite outage. In some embodiments, the object tracking system may communicate with other remote servers (e.g., private servers, etc.), user devices, or the like via the satellite transmission.

The object tracking system may include an object tracker. The object tracker may be a wearable device, which may be worn as an accessory by an object (e.g., a person, a pet, or any other suitable device) or otherwise coupled to the object, such as using a Velcro attachment. The object tracker may be in a size of less than or equal to about 2 inches in length, less than or equal to about 2 inches in width, and less than or equal to 0.25 inches in height (e.g., about 2"×2"×¼" or about 1"×4"×¼") with a weight less than about 3 oz. The object tracker may include a computer system embedded in a flexible resin (also referred to as a rubber-like material with elastomeric properties but low elongation) that is waterproof to a depth of about 40' and resistant to dust, dirt and the elements. The object tracker may be driven by a set of algorithms, components, and code. The object tracker may be powered by a battery (e.g., a solar rechargeable battery, a lithium-ion battery, a battery with various universal serial bus (USB) ports), and/or a solar charger. The object tracker may include one or more ports and/or slots (e.g., USB ports, memory slots, or the like) for downloading data into memories such as micro secure digital (SD) memories, SD cards, or thumb drives. The object tracker may include an imaging device (e.g., a fiber optic video camera, a thermal camera any other suitable imaging device) and/or microphone capabilities. The use of the term "about" in conjunction with a numerical value refers to within 20% of the stated numerical value.

The object tracker may communicate with one or more computers, servers of the object tracking system via satellite transmissions and bypasses the internet to protect recorded data. A satellite transmission may provide data communication using a satellite (e.g., an Iridium-platform satellite). The satellite transmission may be performed by satellite modems, or any other suitable devices providing satellite transmission. Remote firmware and software updates via satellite transmission may keep the object tracker updated. Memory card of the object tracker may mount when the object tracker boots up, and unmount when the object tracker is switched off. While the object tracker is active, signals sent from the object tracker may be encrypted. While the object tracker is in a sleep mode, access to the recorded data may be prohibited to prevent unauthorized access.

Embodiments of the disclosure may include an object tracker that may be a Global Positioning System (GPS) based tracker to provide geolocation and time information based on signals from GPS satellites. A GPS satellite may transmit a radio signal indicative of a satellite position and a satellite time corresponding to the satellite position. The object tracker may receive signals from one or more GPS satellites to determine a location of the object tracker and a timestamp associated with the location. The timestamp may be a clock deviation from the satellite time, since speed of radio waves is constant and independent of the speed of the GPS satellite, a time delay between when the GPS satellite transmits a signal and the object tracker receives is proportional to a distance from the GPS satellite to the object tracker. The object tracker may store the location and the timestamp. For instance, the object tracker may determine an activation signal indicative of the object tracker being active. The object tracker may mount a memory card (e.g., an SD card, a thumb drive, etc.) based on the activation signal. The object tracker may store the timestamp and the location associated with the object tracker in the memory card. The object tracker may send the location the timestamp to one or more computers and/or servers of the object tracking system and may receive aggregated data from the one or more computers and/or servers. The aggregated data may be indicative of locations and timestamps associated with other object trackers. In some embodiments, the aggregated data may include information (e.g., an object identifier, a device identifier, or the like) associated with other object trackers. The object tracker may send aggregated data to a user device (e.g., a mobile device, a computer, a laptop, or any other suitable user devices) for presentation. For instance, the object tracker may send the location and the timestamp to the one or more computers and/or servers, and receive the aggregated data from the one or more computers and/or servers via a mesh network and/or satellite transmission and may bypass the internet. Additionally and/or alternatively, the object tracker may encrypt a signal indicative of the location and the timestamp while the object tracking being active. The object tracker may send the encrypted signal to the one or more computers and/or servers. As such, the location and the timestamp can be protected during a communication between the object tracker and the one or more computers and/or servers. The user device may be associated with a user wearing the object tracker.

The one or more computers and/or servers (e.g., the one or more computers and/or servers may be included in an aerial vehicle) of the object tracking system may communicate with one or more object trackers and one or more user devices. The one or more computers and/or servers may receive a first location associated with a first object tracker. For instance, the more computers and/or servers may receive a signal indicative of the first location from the first object tracker in real-time, or in substantially real-time. Additionally and/or alternatively, the one or more computers and/or servers may receive the signal during a predetermined time period (e.g., during a time period set by the user). The one or more computers and/or servers may decrypt the signal, and determine the first location from the decrypted signal.

The one or more computers and/or servers may receive imaging content and generate a composite imaging content. In some embodiments, the one or more computers and/or servers may receive imaging content, such as content received from one or more imaging devices (e.g., images and/or videos captured by an infrared imaging device, a thermal imaging device, etc.). In some embodiments, the object tracking system may include the one or more imaging devices. In some embodiments, the one or more imaging devices may be external to the object tracking system. In some embodiments, the one or more computers and/or servers may be generating composite imaging content. The one or more computers and/or servers may determine that one or more objects in the imaging content are associated with one or more object trackers. For instance, the one or more computers and/or servers may determine that a first timestamp associated with a first location of the first object tracker matches a first timestamp of first imaging content. The one or more computers and/or servers may identify a first object in the first imaging content via one or more image analysis algorithms (e.g., a scale-invariant feature transform, deep neural networks, convolution neural networks, a support vector machine, a histogram of oriented gradients, face recognition, or any other suitable algorithm for identifying an object in an image or a frame of a video). The one or more computers and/or servers may determine the first object associated with an object identifier (e.g., a user identification number, a social security number, a driver license number, a device identifier, a pet identifier, etc.) based on a look-up table stored in a data store of the tracking computer(s). The look-up table may associate objects with respective object identifiers. The one or more computers and/or servers may receive the first object identifier and a first device identifier from the first object tracker. The one or more computers and/or servers may associate the first object in the first imaging content with the first object tracker based on the object identifier. The one or more computers and/or servers may generate a first indicator indicating the first location and the first object identifier.

The one or more computers and/or servers may generate a first composite image content by placing the first indicator in proximity of the first object in the first imaging content. For instance, the one or more computers and/or servers may place the first indicator in proximity of the first object in the first imaging content, e.g., a distance between the first indicator and the first object is below a distance threshold. Additionally and/or alternatively, the one or more computers and/or servers may overlay the first indicator with a portion of the first object. In some embodiments, the first imaging content may be a geographic map. The one or more computers and/or servers may place the first indicator at a location in the geographic map matching the first location.

The one or more computers and/or servers may use a graphical user interface to present the composite imaging content. In some embodiments, the one or more computers and/or servers may provide and/or create an application interface (or website) that the user device may access via the satellite transmission. The user device may present the composite imaging content to users who monitor one or more object trackers. The user device may call one or more active programming interfaces of the one or more computers and/or servers using the application interface to provide an object identifier and receive the composite imaging content and/or associated information (e.g., locations and timestamps associated with one or more object trackers, object identifiers associated with one or more object trackers, etc.).

In some embodiments, the one or more computers and/or servers may generate a composite imaging content with multiple indicators associated with respective objects in the first imaging content. For instance, the one or more computers and/or servers may receive a second location and a second timestamp associated with a second object tracker via a satellite transmission. Additionally and/or alternatively, the one or more computers and/or servers may receive the second location and the second timestamp from the object tracker. As one example, the second object tracker may send the second location and second timestamp to the first object tracker via a mesh network. The first object tracker may send the second location and the second timestamp to the one or more computers and/or servers via the satellite transmission. In addition to place, the first indicator in proximity of the first object in the first imaging content as described above, the one or more computers and/or servers may determine that a second timestamp associated with the second location matches the first timestamp of the first imaging content. The one or more computers and/or servers may identify a second object in the first imaging content via the one or more image analysis algorithms as described above. The one or more computers and/or servers may determine the second object associated with a second object identifier based on the look-up. The one or more computers and/or servers may receive the second object identifier and a second device identifier from the second object tracker via the satellite transmission. The one or more computers and/or servers may associate the second object in the first imaging content with the second object tracker based on the second object identifier. The one or more computers and/or servers may generate a second indicator indicating the second location and the second object identifier. The one or more computers and/or servers place the second indicator in proximity of the second object in the first imaging content, e.g., a distance between the second indicator and the second object is below the distance threshold such that the second indicator is placed closer to the second object than the first indicator relative to the second object. Additionally and/or alternatively, the one or more computers and/or servers may overlay the second indicator with a portion of the second object. In this manner, the one or more computers and/or servers may generate a composite imaging content, including the first indicator and the second indicator. In some embodiments, the first imaging content may be a geographic map. The one or more computers and/or servers may place both the first indicator and the second indicator at a respective location in the geographic map matching the first location and the second location, respectively.

In some embodiments, the one or more computers and/or servers may determine that the second timestamp associated with the second location does not match the first timestamp of the first imaging content and the second timestamp associated with the second location matches a second timestamp of second imaging content. The second imaging content may be captured by the same imaging device for capturing the first imaging content, but the second imaging content is associated with a different timestamp. Additionally and/or alternatively, the second imaging content may be captured by a second imaging device that is different from the imaging device for capturing the first imaging content. The second imaging device may be an infrared imaging device, a thermal imaging device, or any other suitable imaging device. In some embodiments, the object tracking system may include the second imaging device. In some embodiments, the second imaging device may be external to the object tracking system. The one or more computers and/or servers may identify the second object in the second imaging content via the one or more image analysis algorithms as described above. The one or more computers and/or servers may place the second indicator in proximity of the second object in the second imaging content, e.g., a distance between the second indicator and the second object is below the distance threshold. Additionally and/or alternatively, the one or more computers and/or servers may overlay the second indicator with a portion of the second object. In this manner, the one or more computers and/or servers may generate a second composite imaging content, including the second indicator. In some embodiments, the one or more computers and/or servers may use a graphical user interface to present the first composite imaging content and the second composite imaging content side by side, or in a column. In some embodiments, the first composite imaging content may be overlaid with the second composite imaging content. As one example, when the user device is associated with the first object tracker, the second composite imaging content may have a smaller screen size than the first composite imaging content. When the user device is associated with the second object tracker, the second composite imaging content may have a larger screen size that the first composite imaging content.

Referring to FIG. 1A, a schematic diagram of example an use case 100 illustrating object trackers in combination with infrared imaging and thermal imaging in accordance with one or more example embodiments of the disclosure. First composite imaging content 110 generated by an objecting tracking system (not shown) includes first imaging content 102. The first imaging content 102 has the same timestamp as timestamps of a first object tracker, a second object tracker, and a third object tracker (not shown). The first imaging content 102 may be captured by an infrared imaging device (not shown) of the object tracking system. The first imaging content 102 depicts a first object 106A associated with the first object tracker (not shown), a second object 106B associated with the second object tracker (not shown), and a third object 106C associated with the third object tracker (not shown). A first indicator 104A indicating the first location (Location 1) and the first user identifier (User ID 1). A second indicator 104B indicating the second location (Location 2) and the second user identifier (User ID 2). A third indicator 104C indicating the third location (Location 3) and the third user identifier (User ID 3). The first indicator 104A is overlaid with a portion of the first object 106A, the second indicator 104B is placed closer to the second object 106B than the first indicator 104A and the third indicator 104C relative to the second object 106B, and the third indicator 104C is placed closer to the third object 106C than the first indicator 104A and the second indicator 104B relative to the third object 106C.

Second composited imaging content 120 generated by the object tracking system includes second imaging content 130. The second imaging content 130 has the same timestamp as timestamps of a fourth object tracker, a fifth object tracker, and a sixth object tracker (not shown). The second imaging content 130 may be captured by a thermal imaging device (not shown) of the object tracking system. The second imaging content 130 includes a fourth object 114A associated with the fourth object tracker (not shown), a fifth object 114B associated with a fifth object tracker (not shown), a sixth object 114C associated with a sixth object tracker (not shown), and a seventh object 114D associated with a seventh object tracker (not shown). A fourth indicator 112A indicating the fourth location (Location 4) and the fourth user identifier (User ID 4). A fifth indicator 112B indicating the fifth location (Location 5) and the fifth user identifier (User ID 5). A sixth indicator 112C indicating the sixth location (Location 6) and the sixth user identifier (User ID 6). A seventh indicator 112D indicating the seventh location (Location 7) and the seventh user identifier (User ID 7). The fourth indicator 112A is overlaid with a portion of the fourth object 114A, the fifth indicator 112B is overlaid with a portion of the fifth object 114B, the sixth indicator 112C is overlaid with a portion of the sixth user 114C, and the seventh indicator 112D is overlaid with a portion of the seventh object 114D.

The object tracking system may send the first composite imaging content 110 and the second composite imaging content 120 to one or more user devices such that the one or more user devices may present the first composite imaging content 110 and the second composite imaging content 120 to users who monitor these objects.

Figure 1B:
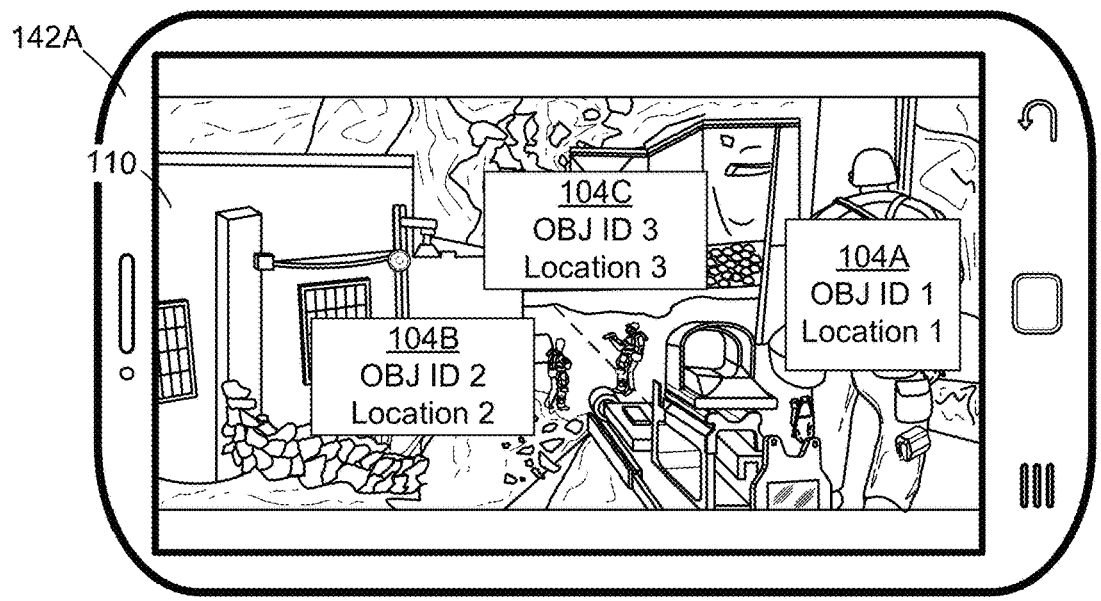
FIG. 1B is a schematic diagram of an example use case illustrating object trackers in combination with infrared imaging and thermal imaging presented in user devices in accordance with one or more example embodiments of the disclosure.
Figure 1B:
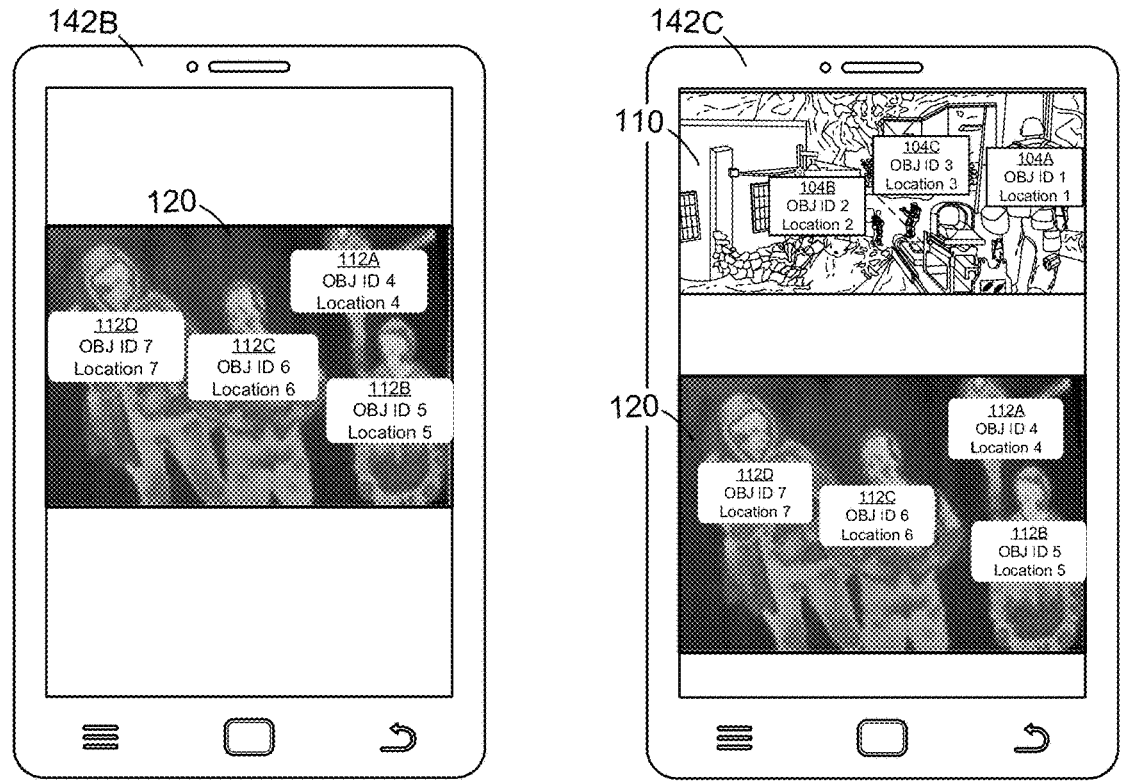

FIG. 1B is a schematic diagram of an example use case 140 illustrating object trackers in combination with infrared imaging and thermal imaging presented in user devices in accordance with one or more example embodiments of the disclosure. The object tracking system (not shown) may provide and/or create an application interface (or website) that the user devices may access via the satellite transmission. The user device may present the composite imaging content to users who monitor one or more object trackers. As shown in FIG. 1B, a user device 142A, presents the first composite imaging content 110 that is sent by the object tracking system. A user device 142B presents the second composite imaging content 120 that is sent by the object tracking system. A user device 142C presents the first composite imaging content 110 and the second composite imaging content 120 in a column. While example embodiments of the disclosure may be described in presenting the two composite imaging content in a column, it should be appreciated that the disclosure is more broadly applicable to present multiple composite imaging content in various manner on any suitable user device including, without limitation, a smartphone, a tablet, a wearable device, or any other suitable device. The user devices 142A-142C may be the same user device. In some embodiments, the user devices 142A-142C may be different user devices.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative System Architecture

Figure 2A:
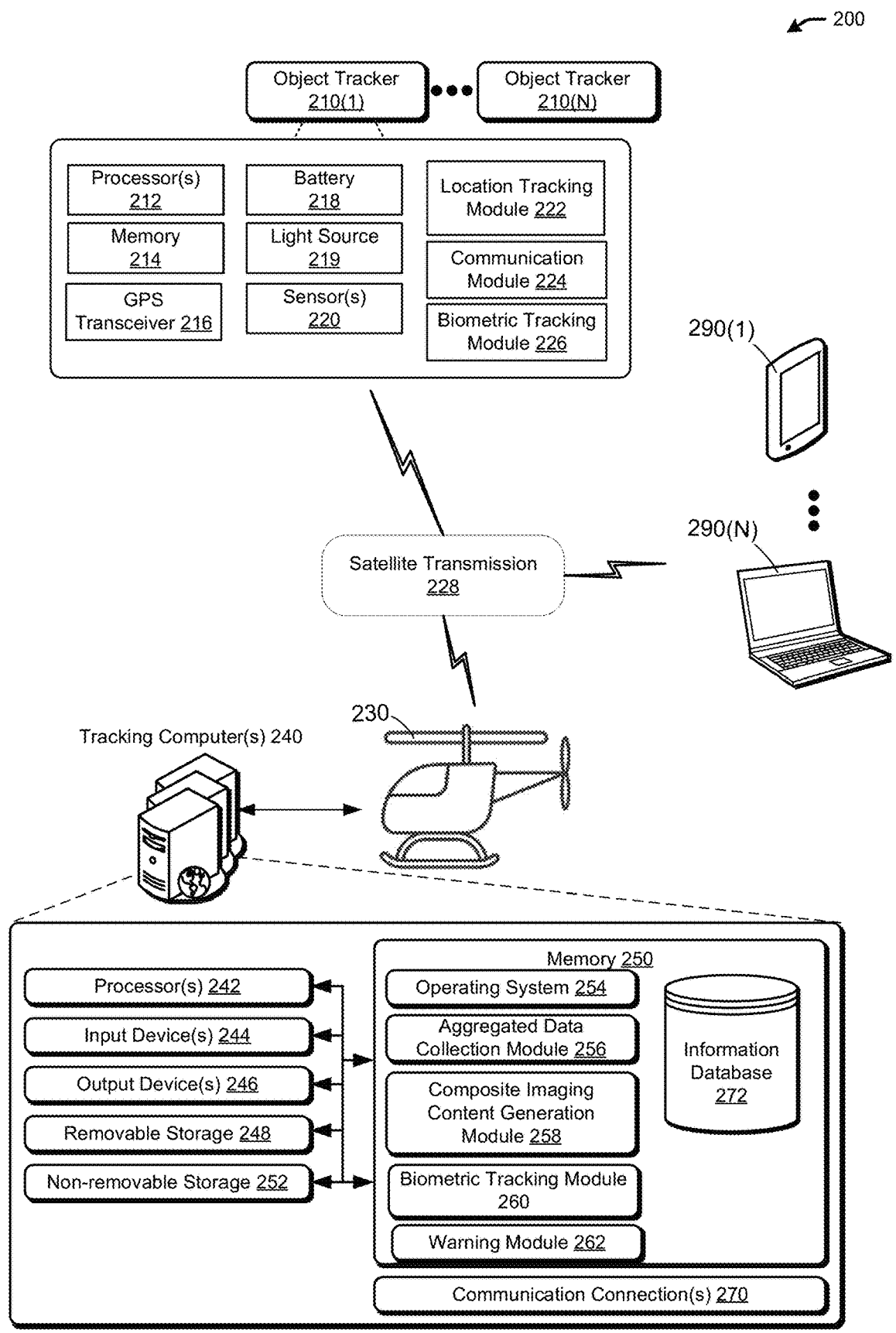
FIG. 2A is a schematic illustration of example object tracking system in accordance with one or more example embodiments of the disclosure.

FIG. 2A is a schematic illustration of example object tracking system 200 in accordance with one or more example embodiments of the disclosure.

As shown in FIG. 2A, the object tracking system 200 may include one or more object trackers 210(1), ..., 210(N) that may be coupled to and/or worn by one or more objects (e.g., the objects 106A-106C, 114A-114D of FIG. 1A), one or more computing devices 290(1), ..., 290(N) (e.g., the user devices 142A-142C of FIG. 1B), and a tracking computer(s) 240. In some embodiments, an aerial vehicle 230 (e.g., aircraft, drones, or any other suitable vehicle) may include the tracking computer(s) 240. In some embodiments, the aerial vehicle 230 may communicate the tracking computer(s) 240. In the object tracking system 200, communications among the object trackers 210, the aerial vehicle 230, and the tracking computer(s), the computing device 290 are via a satellite transmission 228. The satellite transmission 228 may provide data communication using a satellite (e.g., an Iridium-platform satellite). The satellite transmission 228 may be performed by satellite modems, or any other suitable devices providing satellite transmission.

In an illustrative configuration, an object tracker 210 is configured to tracking an object. The object tracker 210 may include one or more processors 212, one or more memory devices 214 (generically referred to herein as memory 214), a GPS transceiver 216, a battery 218, a light source 219, one or more sensors 220, a location tracking module 222, a communication module 224, and a biometric tracking module 226.

The memory 214 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory. In various implementations, the memory 214 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 214 may include main memory as well as various forms of cache memory such as instruction cache(s), data cache(s), translation lookaside buffer(s) (TLBs), and so forth. Further, cache memory, such as a data cache, may be a multi-level cache organized as a hierarchy of one or more cache levels (L1, L2, etc.).

The memory 214 may store computer-executable code, instructions, or the like that may be loadable into the memory 214 and executable by the processor(s) 212 to cause the processor(s) 212 to perform or initiate various operations. The memory 214 may store one or more program modules, applications, or the like such as, for example, the location tracking module 222, the communication module 224, and the biometric tracking module 226. Any of the modules depicted in FIG. 2A may include computer-executable code, instructions, or the like that may be loaded into the memory 214 for execution by one or more of the processor(s) 212. Further, any data stored in the memory 214 may be loaded for use by the processor(s) 212 in executing computer-executable code.

The processor(s) 212 may be configured to access the memory 214 and execute computer-executable instructions loaded therein. For example, the processor(s) 212 may be configured to execute computer-executable instructions of the various program modules of the object tracker 210 to cause or facilitate various operations to be performed in accordance with one or more embodiments of the disclosure. The processor(s) 212 may include any suitable processing unit capable of accepting data as input, processing the input data in accordance with stored computer-executable instructions, and generating output data. The processor(s) 212 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 212 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 212 may be capable of supporting any of a variety of instruction sets.

The GPS transceiver 216 may receive satellite signals from one or more GPS satellites, the satellite signals indicative of one or more satellite locations, and one or more satellite timestamps associated with respective satellite locations.

The battery 218 may power the object tracker 210. The battery 218 may include a solar rechargeable battery, a lithium-ion battery, a battery with various universal serial bus (USB) ports, and/or a solar charger.

The light source 219 may emit light beams as a locating strobe. For instance, the light source 219 may include an infrared light source, a visible light source, or any other suitable light source. The light source 219 may emit an infrared locating strobe, a visible locating strobe, or a locating strobe in any other suitable wavelength range. In some embodiments, the object tracker may include different operational modes for emitting the locating strobe. For example, an operational mode may enable the light source 219 to emit a strobe in a particular frequency range. Each operational mode may indicate an emergency level. The light source 219 emitting a strobe with higher frequency than other object trackers may indicate that an object wearing the object tracker 210 may be in a higher emergency level and need quicker assistance.

The sensor 220 may determine one or more vital signs (e.g., a pulse rate, a respiration rate, a temperature, etc.) associated with an object (e.g., a person or a pet) wearing the object tracker 210, and sending the one or more vital signs to the biometric tracking module 226, the computing devices 290 and/or the tracking computer(s) 240 via the communication module 224.

Referring now to functionality supported by the various program modules depicted in FIG. 2A, the location tracking module 222 including computer-executable instructions, code, or the like that responsive to execution by one or more of the processor(s) 212 may perform functions including, but not limited to, determining a location of the object tracker 210 and a timestamp associated with the location, and storing the location and the timestamp. The timestamp may be a clock deviation from the satellite time, since speed of radio waves is constant and independent of the speed of the GPS satellite, a time delay between when the GPS satellite transmits a signal and the object tracker 210 receives is proportional to a distance from the GPS satellite to the object tracker 210. For instance, the location tracking module 222 may determine an activation signal indicative of the object tracker 210 being active. The location tracking module 222 may instruct the memory 214 to mount a memory card (e.g., an SD card, a thumb drive, etc.) based on the activation signal. The location tracking module 222 may instruct the memory 214 to store the timestamp and the location associated with the object tracker 210 in the memory card.

In some embodiments, the location tracking module 222 may receive satellite spatial and temporal data from the communication module(s) 224. For instance, the communication module(s) 224 may be configured to support a live data stream received from the GPS transceiver 216. The communication module(s) 224 may determine to send the satellite spatial and temporal data to the location tracking module 222 and all other all other data (e.g., windspeed, temperature, or any other suitable non-location data) to a memory card. In some embodiments, the memory card can be mounted into the memory 214. The communication module(s) 224 may separate the live data stream into the satellite spatial and temporal data and all other data. The communication module(s) 224 may stream the satellite spatial and temporal data to the location tracking module 222 and may compress and/or store all other data into a memory card. All of data (e.g., sate spatial and temporal data, and all other data) in a constant live feed may be supplied by one or more GPS satellites via the satellite transmission 228. The commutation module(s) 224 may separate and redirect the live feeds to the location tracking module 222 and the memory card, respectively. By streaming data into different destinations (e.g., location tracking module 222, the memory card, or the like) instead of using all of the data, the location tracking module 222 may determine more accurate locations and timestamps associated with corresponding locations for the object tracker(s) 210. For instance, the location tracking module(s) 224 may determine an intermediate location associated with the object tracker(s) 210. One or more temporal variables may carry with the intermediate location. The location tracking module 222 may extract the one or more temporal variables to determine a true location of the object tracker(s) 210. In some embodiments, the location tracking module 222 may determine the intermediate location based on solving one or more equations including the satellite spatial and temporal data. The location tracking module 222 may extract the one or more temporal variables based on one or more algorithm extracting temporal variables. In conventional GPS systems, because temporal variables are not utilized for determining locations, the range of inaccuracy may vary based on terrain. A greater difference in the terrain may result in a greater inaccuracy in a clock deviation from the satellite time, if the temporal information is not considered. In contrast, regardless of the terrain, the location tracking module 222 may determine location data based on the temporal variables in the satellite spatial and temporal data with greater accuracy.

In some embodiments, the object tracker 210 may positively identify individual objects within less than about three inches, in contrast to about ten feet in accuracy of conventional tracking systems (e.g., global positioning system, etc.).

The communication module(s) 224 including computer-executable instructions, code, or the like that responsive to execution by one or more of the processor(s) 232 may perform functions including, but not limited to, sending the location and the timestamp to the tracking computer(s) 240, receiving aggregated data from the tracking computer(s) 240. The aggregated data may be indicative of locations and timestamps associated with other object trackers 210. The communication module(s) 224 may send aggregated data to one or more computing devices 290 for presentation. For instance, the computing devices 290 may call one or more active programming interfaces of the tracking computer(s) 240 using an application interface to present the aggregated data (e.g., locations and timestamps associated with one or more object trackers, object identifiers associated with one or more object trackers, etc.). In some embodiments, the communication module(s) 224 may communicate with other object trackers via a mesh network. For instance, the object tracker 210(1) may receive a second location and a second timestamp associated with the object tracker 210(2) via a mesh network. The communication module(s) 224 of the object tracker 210(1) may send the second location and the second timestamp to the tracking computers 240, and/or the computing devices 290.

A mesh network may be a local network topology in which object trackers 210 serves as nodes connect directly, dynamically, and non-hierarchically to as many other object trackers 210 as possible and cooperate with one another to efficiently route data among the object trackers 210. This lack of dependency on one object tracker 210 allows for every object tracker 210 to participate in sharing information of locations and/or aggregated data. If one object tracker 210 fails, other object trackers 210 may communicate with the tracking computer(s) 240 using the shared information associated with the failed object tracker. This, in turn, contributes to fault-tolerance, security, and reliability. The communication module(s) 224 may send a location and a timestamp associated with a different object tracker 210 to the computing device(s) 290 for presentation such that the computing device(s) 290 may be able to monitor locations of different object trackers 210. In some embodiments, if distances among the object trackers 210 is within a distance threshold, communication among the object trackers 210 via a mesh network may be via a cellular connectivity, Bluetooth connectivity, or any other suitable connectivity for communications in a mesh network. The distance threshold may describe a distance range enabling the object trackers 210 communicate with each other via a cellular connectivity, Bluetooth connectivity, and/or any other suitable connectivity for communications in the distance range. For instance, a distance threshold for Bluetooth connectivity may be in a range of about 328 feet to about 100 meters. A distance threshold for cellular connectivity may be in a range of about 45 miles away from a cell tower. If distances among the object trackers 210 are greater than a distance threshold, communication among the object trackers 210 may be via the tracking computer(s) 240. For instance, a distance between a first object tracker 210(1) and a second object tracker 210(2) may be greater than a distance threshold, the second object tracker 210(2) may send a second location and a second timestamp to the tracking computer(s) 240 via the satellite transmission 228. The tracking computer(s) 240 may send the second location and the second timestamp to the first object tracker 210(1) via the satellite transmission 228. Examples of the mesh network are further described with respect to FIG. 2B.

In some embodiments, the communication module(s) 224 may determine that the satellite transmission 228 is disconnected (e.g., during intermittent signal interruptions or a satellite outage). The communication module(s) 224 may send aggregated data from a first object tracker 210(1) to the computing device(s) 290 associated with the first object tracker 210(1) and/or the second object tracker 210(2) via the mesh network. For example, the communication module(s) 224 may send aggregated data from a first object tracker 210(1) to a first computing device 290(1) associated with the first object tracker 210(1) via a cellular connectivity, Bluetooth connectivity, and/or any other suitable connectivity for communications in a mesh network. As another example, the communication module(s) 224 may send aggregated data from a first object tracker 210(1) to the second object tracker 210(2) via a cellular connectivity, Bluetooth connectivity, and/or any other suitable connectivity for communications in a mesh network, and then the second object tracker 210(2) may send the aggregated data from a first object tracker 210(1) to a second computing device 290(2) associated with the second object tracker 210(12) via a cellular connectivity, Bluetooth connectivity, and/or any other suitable connectivity for communications in a mesh network.

The computing devices 290 may be associated with an object who may wear the object tracker 210(1) or may be coupled to the object tracker 210(1). In some embodiments, the computing devices 290 may be associated with a different object who may wear a different object tracker 210(2). In some embodiments, the computing devices 290 may be associated with any users who may monitor one or more object trackers 210(1), . . . , 210(N). For instance, the communication module(s) 224 may send the location and the timestamp to the tracking computer(s) 240, and receive the aggregated data from the tracking computer(s) 240 are via the satellite transmission 228 and bypassing the internet. Additionally and/or alternatively, the communication module(s) 224 may encrypt a signal indicative of the location and the timestamp while the object trackers 210 being active. The communication module(s) 224 may send the encrypted signal to the tracking computer(s) 240.

The communication module(s) 224 may receive a request to access the memory 214. The communication module(s)

224 may determine a signal indicative of the object tracker 210 being a sleep mode, and the communication module(s) 224 may reject the request, thereby, the object tracker 210 may not be hacked by any unauthorized users. In some embodiments, the communication module(s) 224 may encrypt communications among the object tracker(s) 210, the computing device(s) 290, and the tracking computer(s) 240. For instance, the communication module(s) 224 may generate a one-time-use encryption key (e.g., Vernam cipher, or any other suitable cipher for one-time use) to encrypt the communications. Additionally and/or alternatively, an object who is wearing the object tracker(s) 210 and/or a user who is monitoring the object tracker(s) 210 may input the encryption key into the object tracker(s) 210. If the object tracker(s) 210 is in a sleep mode or the object tracker(s) 210 is shut down, the encryption key that was already used will no longer be viable or verified on the object tracker(s) 210. Accordingly, the communication module(s) 224 may reject a request to access the memory 214. In some embodiments, any data (e.g., packets) associated with the communications among the object tracker(s) 210, the computing device(s) 290, and the tracking computer(s) 240 happens to be intercepted, the level of encryption standard used in the object tracker(s) 210 may be unhackable per the encryption standard so the data may be useless to the person or device that intercepted the data. In some embodiments, the one-time-user encryption key may be generated by components (e.g., communication connection(s) 270, or the like) of the tracking computer(s) 240 and/or the computing device(s) 290.

The biometric tracking module 226 including computer-executable instructions, code, or the like that responsive to execution by one or more of the processor(s) 212 may perform functions including, but not limited to, receiving one or more vital signs from the sensor(s) 220, determining whether or not at least one of the one or more vital signs exceeds a safety threshold (e.g., a pulse rate safety threshold, a respiration rate safety threshold, a temperature safety threshold, etc.), determining that a pressure on a button of the object tracker 210, the button indicative of an assistance request, and instructing the light source 219 to emit a locating strobe. For instance, the pulse rate safety threshold may describe a range of pulse rates for an healthy object (e.g., a normal pulse rate for healthy adults may range from about 60 to about 100 beats per minute, a normal pulse rate for healthy cats may range from about 140 to about 220 beats per minute, etc.). The respiration rate safety threshold may describe a range of respiration rates for an healthy object (e.g., a normal respiration rate for an adult at rest is about 12 to about 20 breaths per minute, a normal cat takes between about 20 to about 30 breaths per minute, etc.). The temperature safety threshold may describe a range of temperatures for a healthy object (e.g., a normal temperature for human is from about 97° F. (36.1° C.) to about 99° F. (37.2° C.), and a normal body temperature for cats falls in the range of about 99.5° F. to 102.5° F., etc.). A pulse rate of the object being lower than the pulse rate safety threshold, a respiration rate of the object being lower the respiration rate, and/or a temperature of the object being lower than the temperature threshold may indicate that the object may pass out or lose consciousness. A pulse rate of the object being greater than the pulse rate safety threshold, a respiration rate of the object being greater the respiration rate, and/or a temperature of the object being greater than the temperature threshold may indicate that the object may be in stress.

Referring now to other illustrative components depicted in FIG. 2A, the tracking computer(s) 240 may be configured to communicate with one or more object trackers 210 and one or more computing devices 290. The tracking computer(s) 240 may be any type of computing devices, such as, but not limited to, mobile, desktop, and/or cloud computing devices, such as servers. The tracking computers 240 may include one or more servers, perhaps arranged in a cluster, as a server farm, or as individual servers not associated with one another.

The tracking computers 240 may include at least a memory 250 and one or more processing units (or processors) 242. The processors 242 may be implemented as appropriate in hardware, software, firmware, or combinations thereof. Software or firmware implementations of the processors 242 may include computer-executable or machine-executable instructions written in any suitable programming language to perform the various functions described.

The memory 250 may store program instructions that are loadable and executable on the processors 242, as well as data generated during the execution of these programs. Depending on the configuration and type of the tracking computers 240, the memory 250 may be volatile (such as random access memory (RAM)) and/or non-volatile (such as read-only memory (ROM), flash memory, etc.). The tracking computers 240 or server may also include additional removable storage 248 and/or non-removable storage 252 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 250 may include multiple different types of memory, such as static random access memory (SRAM), dynamic random access memory (DRAM), or ROM.

The memory 250, the removable storage 248, and the non-removable storage 252 may be all examples of computer-readable storage media. For example, computer-readable storage media may include volatile and non-volatile, removable and non-removable media implemented in any method or technology for the storage of information such as computer-readable instructions, data structures, program modules, or other data. The memory 250, the removable storage 248, and the non-removable storage 252 may be all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the tracking computers 240 or other computing devices. Combinations of any of the above should also be included within the scope of computer-readable media.

Alternatively, computer-readable communication media may include computer-readable instructions, program modules, or other data transmitted within a data signal, such as a carrier wave, or other transmissions. However, as used herein, computer-readable storage media does not include computer-readable communication media.

The tracking computers 240 may also contain communication connection(s) 270 that allows the tracking computers 240 to communicate with a stored database, another computing device or server, user terminals, and/or other devices on a network. The tracking computers 240 may also include input device(s) 244 such as a keyboard, a mouse, a pen, a voice input device, a touch input device, etc., and output device(s) 246, such as a display, speakers, printers, etc.

Turning to the contents of the memory 250 in more detail, the memory 250 may include an operating system 254 and one or more application programs or services for implementing the features disclosed herein, including an aggregated data collection module 256, a composite imaging content generation module 258, a biometric tracking module 260, and a warning module 262. In some instances, the aggregated data collection module 256, the composite imaging content generation module 258, the biometric tracking module 260, and the warning module 262 may receive, transmit, and/or store information in the database 272.

The aggregated data collection module 256, including computer-executable instructions, code, or the like that responsive to execution by one or more of the processor(s) 242 may perform functions including, but not limited to, receiving locations associated with various object trackers 210. For instance, the aggregated data collection module 256 may receive a first signal indicative of a first location associated with a first object tracker 210(1), and receive a second signal indicative of a second location associated with a second object tracker 210(2) via the satellite transmission 228 in real-time, or in substantially real-time. Additionally and/or alternatively, the aggregated data collection module 256 may receive the signal during a predetermined time period (e.g., during a time period set by the user). The aggregated data collection module 256 may decrypt the first signal, and the second signal. The aggregated data collection module 256 may determine the first location from the decrypted first signal, and the second location from the decrypted second signal. Additionally and/or alternatively, the aggregated data collection module 256 may receive the second location from the first object tracker 210(1) via a mesh network, as further described with respect to FIG. 2B.

The composite imaging content generation module 258 including computer-executable instructions, code, or the like that responsive to execution by one or more of the processor(s) 242 may perform functions including, but not limited to, receiving one or more imaging content, determining that one or more objects in the imaging content are associated with one or more object trackers 210, generating one or more indicators indicating respective locations and respective object identifiers, generating one or more composite imaging content, and sending the composite imaging content to one or more computing devices 290. Examples are described above with respect to FIG. 1A. In some embodiments, the composite imaging content generation module 258 may provide and/or create an application interface (or website) that the one or more computing devices 290 may access. The one or more computing devices 290 may present the composite imaging content to users who monitor one or more object trackers. The one or more computing devices 290 may call one or more active programming interfaces of the composite imaging content generation module 258 using the application interface to receive and present the composite imaging content and/or associated information (e.g., locations and timestamps associated with one or more object trackers, object identifiers associated with one or more object trackers, etc.). In some embodiments, the composite imaging content generation module 258 may use a graphical user interface to present the first composite imaging content and the second composite imaging content side by side, or in a column. In some embodiments, the one or more computing devices 290 may call one or more active programming interfaces of the composite imaging content generation module 258 using the application interface to receive and present the first composite imaging content and the second composite imaging content side by side, or in a column. Examples are described with respect to FIG. 1B and FIG. 2A. In some embodiments, the first composite imaging content may be overlaid with the second composite imaging content. As one example, when a computing device 290(1) is associated with the first object tracker 210(1), on the computing device 290(1), the second composite imaging content may have a smaller screen size than the first composite imaging content. When a computing device 290(2) is associated with the second object tracker 210(2), on the computing device 290(2), the second composite imaging content may have a larger screen size that the first composite imaging content.

The biometric tracking module 260 including computer-executable instructions, code, or the like that responsive to execution by one or more of the processor(s) 242 may perform functions including, but not limited to, receiving one or more vital signs from each object tracker 210, determining whether or not at least one of the one or more vital signs exceeds a safety threshold (e.g., a pulse rate safety threshold, a respiration rate safety threshold, a temperature safety threshold, etc.), determining that a pressure on a button of each object tracker 210, the button indicative of an assistance request, and instructing the light source 219 to emit a locating strobe. In some embodiments, the biometric tracking module 260 is one embodiment of the biometric tracking module 226. In some embodiments, the biometric tracking module 260 may include multiple biometric tracking modules 226, each biometric tracking module 226 associated with each object tracker 210.

The warning module 262 including computer-executable instructions, code, or the like that responsive to execution by one or more of the processor(s) 242 may perform functions including, but not limited to, generating a warning signal and sending the warning signal to a second computing device 290, such as a second computing device 290 may be associated with a second object in proximity of a first object whose vital sign exceeding a safety threshold, or a second computing device 290 may be associated with a second user who monitors the first object (e.g., a team member, a friend, a parent, a pet owner, an officer, a doctor or any other suitable person for providing an assistance) associated with the first object.

The computing devices 290 may be any type of computing devices including, but not limited to, desktop personal computers (PCs), laptop PCs, mobile phones, smartphones, personal digital assistants (PDAs), tablet PCs, game consoles, set-top boxes, wearable computers, e-readers, web-enabled TVs, cloud-enabled devices and work stations, and the like. In certain aspects, the computing devices 290 may include touch screen capabilities, motion tracking capabilities, imaging devices (e.g., infrared imaging devices, thermal imaging devices, etc.), microphones, vision tracking, etc. An imaging device may be a camera or any other suitable devices for capturing images or videos. In some instances, each computing device 290 may be equipped with one or more processors and memory to store applications and data, such as an application that may display the composite imaging content.

Figure 2B:
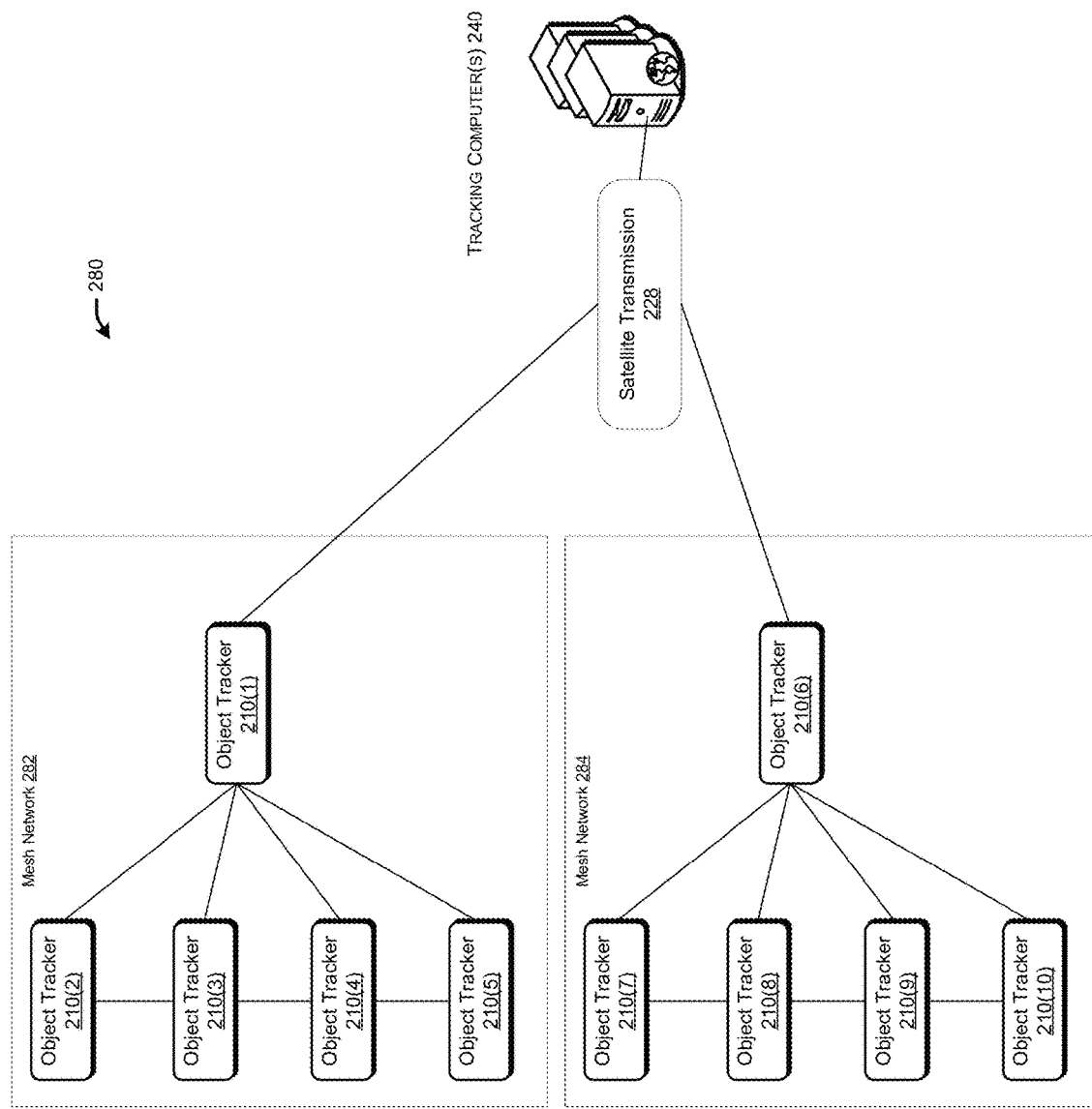
FIG. 2B is a schematic illustration of example mesh network for object tracking in accordance with one or more example embodiments of the disclosure.

FIG. 2B is a schematic illustration of example mesh network 280 for object tracking in accordance with one or more example embodiments of the disclosure. As shown in FIG. 2B, distances among the object trackers 210(1)-210(5) are within a first distance threshold indicating that communications among the object trackers 210(1)-210(5) are via a first mesh network 282 (e.g., a cellular connectivity, Bluetooth connectivity, or any other suitable connectivity for communications in the mesh network 282). Distances among the object trackers 210(6)-210(10) are within a second distance threshold, indicating that communications among the object trackers 210(6)-210(10) are via a second mesh network 284. Communications among the object trackers 210(1)-210(5), the object trackers 210(6)-210(10), and the tracking computers 240 are via the satellite transmission 228. In some embodiments, the first mesh network 282 and the second mesh network 284 may be the same mesh network. In some embodiments, the first mesh network 282 and the second mesh network 284 may be different mesh networks.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database task or search language, or a report writing language. In one or more example embodiments, a software component comprising instructions in one of the foregoing examples of programming languages may be executed directly by an operating system or other software components without having to be first transformed into another form.

A software component may be stored as a file or other data storage construct. Software components of a similar type or functionally related may be stored together, such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines, and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Illustrative Processes

Figure 3:
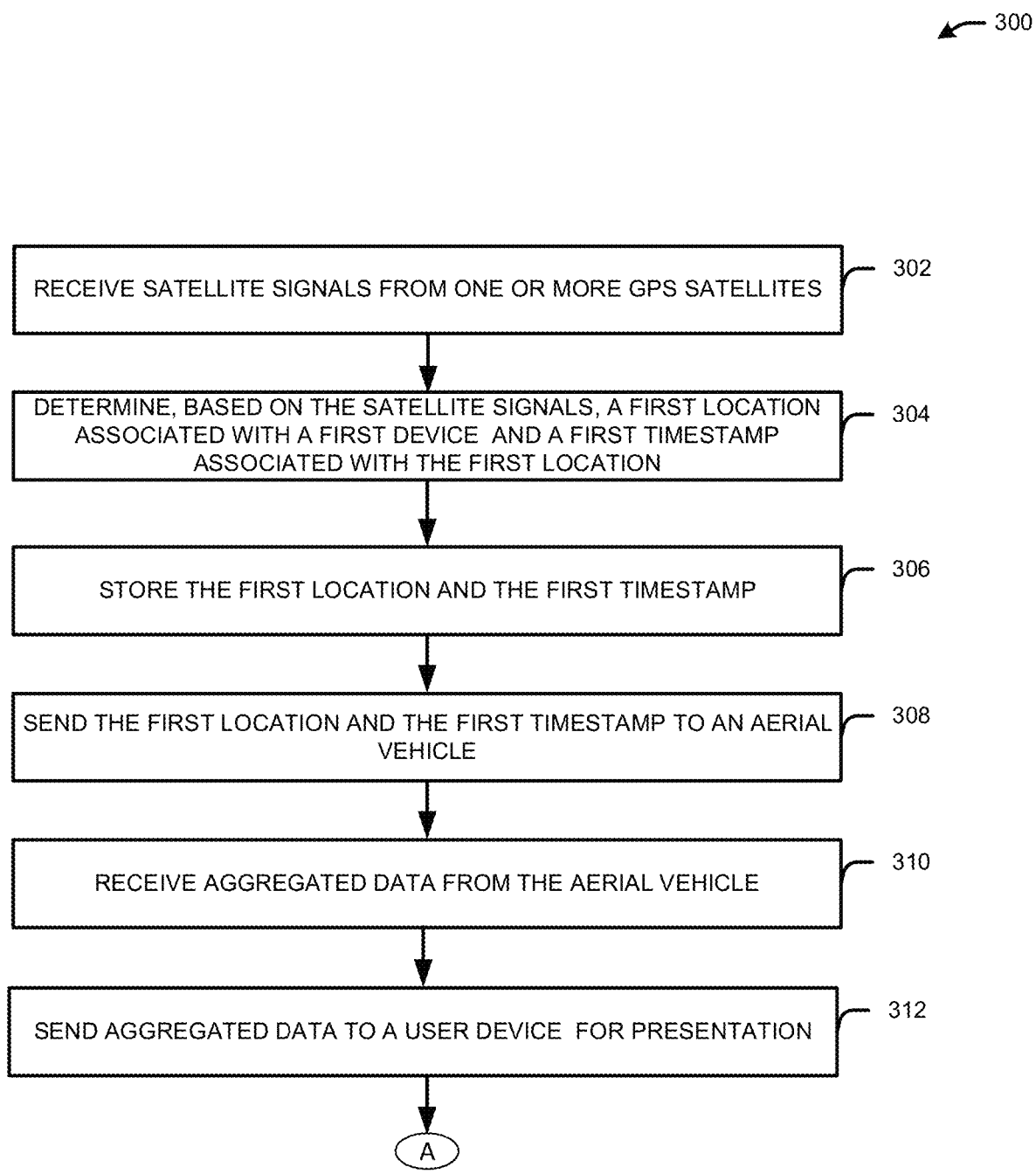
FIG. 3 is an example process flow diagram of an illustrative method for object tracking using object trackers in accordance with one or more example embodiments of the disclosure.

FIG. 3 is an example process flow diagram of an illustrative method 300 for object tracking using object trackers in accordance with one or more example embodiments of the disclosure. In FIG. 3, computer-executable instructions of one or more module(s) of the object tracking system 200, such as the modules of the object tracker 210 may be executed to perform object tracking.

At block 302 of the method 300 in FIG. 3, the method includes receiving satellite signals from one or more GPS satellites. For instance, a GPS transceiver of a first object tracker may receive satellite locations associated with the one or more GPS satellites and satellite timestamps associated with respective satellite locations. Examples are described with respect to FIG. 2A.

Block 304 of the method 300 includes determining, based on the satellite signals, a first location associated with a first device and a first timestamp associated with the first location. In some embodiments, a location tracking module of the first object tracker may determine, based on the satellite signals, a first location associated with the first object tracker and a first timestamp associated with the first location. Examples are described with respect to FIG. 2A.

Block 306 of the method 300 includes storing the first location and the first timestamp. For instance, a memory of the first object tracker may store the first location and the first timestamp. Examples are described with respect to FIG. 2A.

Block 308 of the method 300 includes sending the first location and the first timestamp to an aerial vehicle. In some embodiments, a communication module of the first object tracker may send the first location and the first timestamp to a tracking computer of a first aerial vehicle via a satellite transmission. The first aerial vehicle may send the first location and the first timestamp to a second tracking computer of a second aerial vehicle. In some embodiments, the communication module may send the first location and the first timestamp to the second aerial vehicle via the satellite transmission, and then the second aerial vehicle may send the first location and the first timestamp to the first aerial vehicle. In some embodiments, the first object tracker may send information associated with the first object tracker to the aerial vehicle, e.g., an object identifier, a device identifier, or the like.

Block 310 of the method 300 includes receiving aggregated data from the aerial vehicle. The aggregated data may be indicative of locations and timestamps associated with other object trackers. In some embodiments, the aggregated data may include one or more composite imaging content including the first location and the first timestamp, and locations and timestamps, associated with other object trackers. In some embodiments, the aggregated data may include information associated with other object trackers, such as object identifiers, device identifiers, or the like. Examples of composite imaging content are described with respect to FIG. 2A. In some embodiments, a first tracking computer of a first aerial vehicle may receive one or more imaging content from one or more imaging devices and the first location and the first timestamp, and locations and timestamps associated with other object trackers. The first aerial vehicle may generate one or more composite imaging content, and send the composite imaging content to the first object tracker. In some embodiments, the first aerial vehicle may receive locations and timestamps associated with other object trackers from other aerial vehicle, as described above.

Block 312 of the method 300 includes sending aggregated data to a user device for presentation. In some embodiments, the communication module may send the aggregated data to one or more computing devices (e.g., a mobile device, a computer, a laptop, or any other suitable user devices) via a satellite transmission for presentation. In some embodiments, the communication module may send the aggregated data to one or more computing devices via a mesh network for presentation. Examples are described with respect to FIG. 2A.

In some embodiments, communications among the first object tracker, the aerial vehicle, other aerial vehicles and other object trackers may be via one or more networks wirelessly or wired. The one or more networks may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the one or more networks may have any suitable communication range associated therewith and may include, for example, global networks (e.g., the Internet), metropolitan area networks (MANs), wide area networks (WANs), local area networks (LANs), or personal area networks (PANs). In addition, the one or more networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 4:
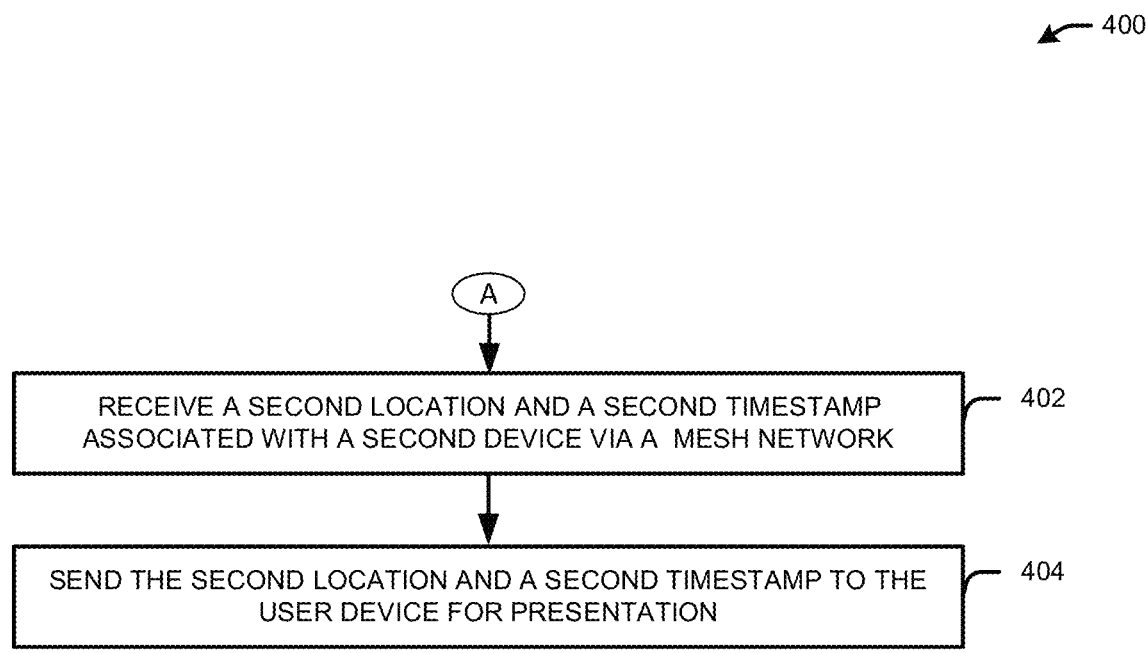
FIG. 4 is an example process flow diagram of an illustrative method for object tracking based on a mesh network in accordance with one or more example embodiments of the disclosure.

FIG. 4 is an example process flow diagram of an illustrative method 400 for object tracking based on a mesh network in accordance with one or more example embodiments of the disclosure.

At block 402 of the method 400 in FIG. 4, the method includes receiving a second location and a second timestamp associated with a second device via a mesh network. For instance, the communication module may receive a second location and a second timestamp associated with a second object tracker via a mesh network. If a distance between the first object tracker and the second object tracker is within a distance threshold, a communication between the first object tracker and the second object tracker may be via a mesh network based on cellular connectivity, Bluetooth connectivity, and/or any other suitable connectivity for communications in a mesh network. If a distance between the first object tracker and the second object tracker is greater than a distance threshold, a communication between the first object tracker and the second object tracker may be via the aerial vehicle. For instance, a distance between the first object tracker and the second object tracker may be greater than a distance threshold, the second object tracker may send a second location and a second timestamp to the aerial vehicle. The aerial vehicle may send the second location and the second timestamp to the first object tracker. Examples of the mesh network are further described with respect to FIG. 2B.

Block 404 of the method 400 includes sending second location and the second timestamp to the user device for presentation. For instance, the communication module may be sending the second location and the second timestamp to the computing device(s) for presentation. Examples are described with respect to FIGS. 2A and 2B.

Figure 5:
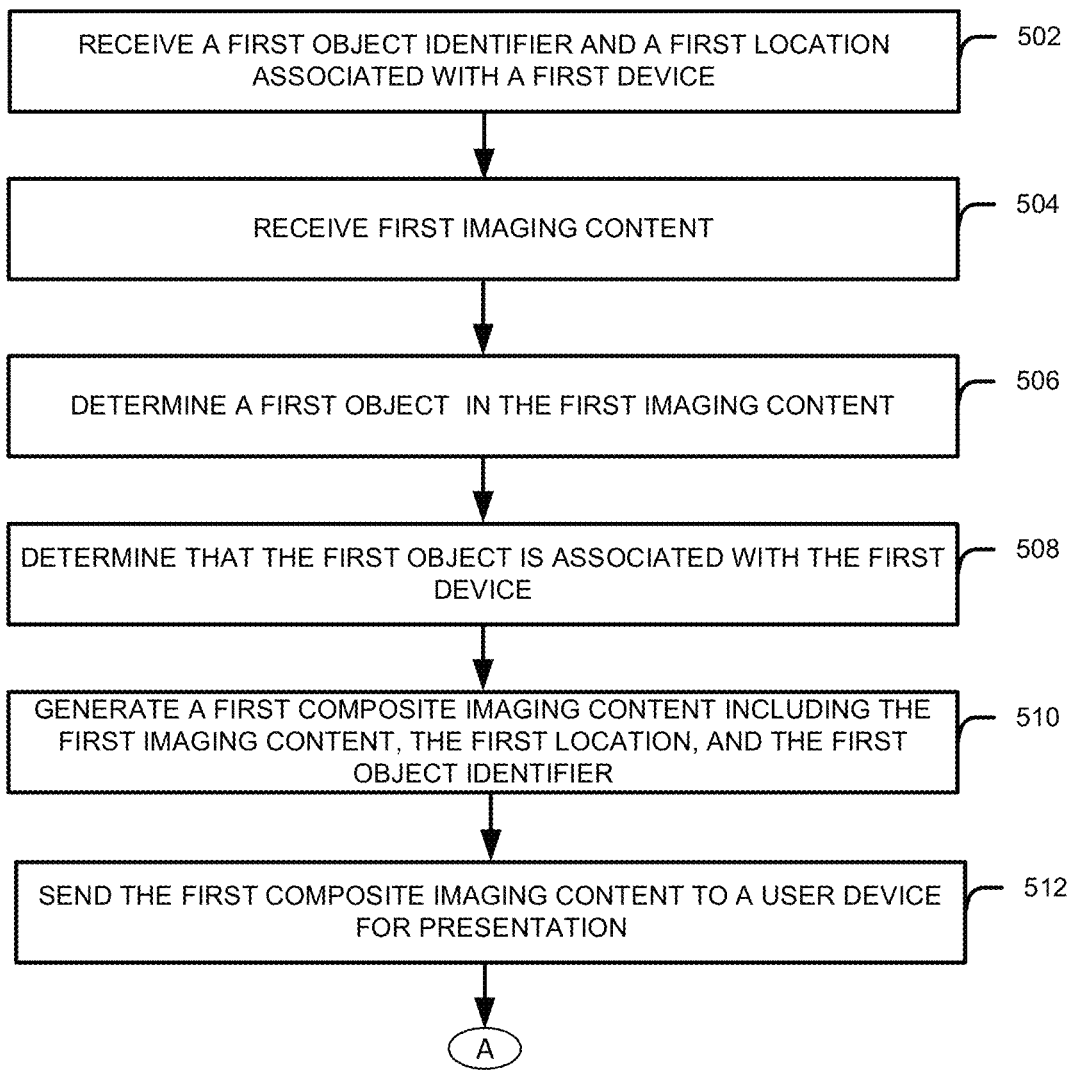
FIG. 5 is an example process flow diagram of an illustrative method for object tracking based on imaging content in accordance with one or more example embodiments of the disclosure.

FIG. 5 is an example process flow diagram of an illustrative method 500 for object tracking based on imaging content in accordance with one or more example embodiments of the disclosure. In FIG. 5, computer-executable instructions of one or more module(s) of the object tracking system 200, such as the modules of the tracking computer(s) 240 may be executed to perform object tracking.

At block 502 of the method 500 in FIG. 5, the method includes receiving a first object identifier and a first location associated with a first device. For instance, an aggregated data collection module of an aerial vehicle may receive a first object identifier and a first location associated with a first object tracker. In some embodiments, the aggregated data collection module may receive the first object identifier from a computing device associated with the first object tracker. For instance, The computing device may call one or more active programming interfaces of a tracking computer of the aerial vehicle using an application interface to provide an object identifier. In some embodiments, the aggregated data collection module of the aerial vehicle may receive a first timestamp associated with the first object tracker. Examples are described with respect to FIG. 2A.

Block 504 of the method 500 includes receiving first imaging content. For instance, a composite imaging content generation module of the aerial vehicle may receive the first imaging content, such as content from one or more imaging devices (e.g., images and/or videos captured by an infrared imaging device, a thermal imaging device, etc.). In some embodiments, the composite imaging content generation module may receive a first timestamp associated with the first imaging content. Examples are described with respect to FIG. 1A and FIG. 2A.

Block 506 of the method 500 includes determining a first object in the first imaging content. For instance, the composite imaging content generation module may determine a first object in the first imaging content via one or more image analysis algorithms described above. In some embodiments, the composite imaging content generation module may determine that a first timestamp associated with a first location of the first object tracker matches a first timestamp of first imaging content. Examples are described with respect to FIG. 1A and FIG. 2A.

Block 508 of the method 500 includes determining that the first object is associated with the first device. For instance, the composite imaging content generation module may determine the first object associated with an object identifier (e.g., a user identification number, a social security number, a driver license number, a device identifier, a pet identifier, etc.) based on a look-up table stored in a datastore of the aerial vehicle. The composite imaging content generation module may receive the first object identifier and a first device identifier from the first object tracker. The composite imaging content generation module may associate the first object in the first imaging content with the first device identifier based on the object identifier. Examples are described with respect to FIG. 1A and FIG. 2A.

Block 510 of the method 500 includes generating a first composite imaging content including the first imaging content, the first location, and the first object identifier. In some embodiments, the composite imaging content generation module may generate a first indicator including the first location and the first object identifier. The composite imaging content generation module may place the first indicator in proximity of the first object in the first imaging content. For instance, the composite imaging content generation module may place the first indicator in proximity of the first object in the first imaging content, e.g., a distance between the first indicator and the first object is below a distance threshold. Additionally and/or alternatively, the composite imaging content generation module may overlay the first indicator with a portion of the first object. Examples are described with respect to FIG. 1A and FIG. 2A.

Block 512 of the method 500 includes sending the first composite imaging content to a user device for presentation. For instance, the composite imaging content generation module may provide and/or create an application interface (or website) that a computing device may access. The computing device may present the composite imaging content to users who monitor the first object tracker. The computing device may call one or more active programming interfaces of the composite imaging content generation module using the application interface to receive and present the first composite imaging content and/or associated information (e.g., locations and timestamps associated with one or more object trackers, object identifiers associated with one or more object trackers, etc.). Examples are described with respect to FIG. 1B and FIG. 2A.

Figure 6:
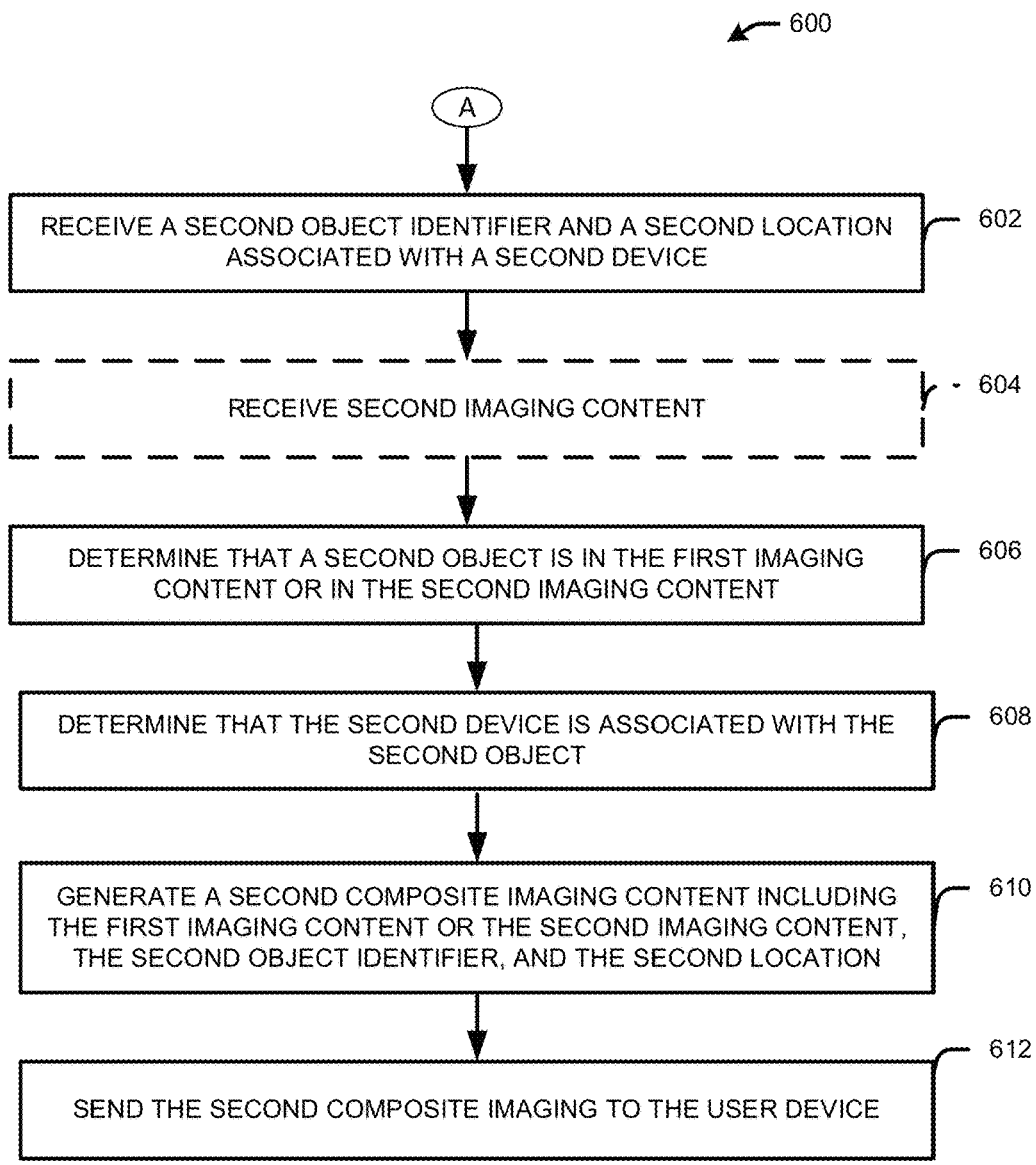
FIG. 6 is an example process flow diagram of an illustrative method for tracking multiple object trackers in accordance with one or more example embodiments of the disclosure.

FIG. 6 is an example process flow diagram of an illustrative method 600 for tracking multiple object trackers in accordance with one or more example embodiments of the disclosure.

At block 602 of the method 600 in FIG. 6, the method includes receiving a second object identifier and a second location associated with a second device. For instance, the aggregated data collection module may receive a second object identifier and a second location associated with a second object tracker via a satellite transmission and/or via a mesh network. In some embodiments, the aggregated data collection module may receive a second timestamp associated with the second object tracker. Examples are described with respect to FIG. 2A and FIG. 2B.

Block 604 of the method 600 includes receiving second imaging content. In some embodiments, the composite imaging content generation module may receive a second timestamp associated with the second imaging content. In some embodiments, the composite imaging content generation module may determine that the second timestamp associated with the second object tracker does not match the first timestamp of the first imaging content, but the second timestamp associated with the second object tracker matches a second timestamp of the second imaging content. The second imaging content may be captured by the same imaging device for capturing the first imaging content, but the second imaging content is associated with a different timestamp. Additionally and/or alternatively, the second imaging content may be captured by a second imaging device that is different from the imaging device for capturing the first imaging content. In some embodiments, the second imaging content and the first imaging content may be the same. Examples are described with respect to FIG. 1A and FIG. 2A.

Block 606 of the method 600 includes determining that a second object is in the first imaging content or in the second imaging content. In some embodiments, the composite imaging content generation module may determine that the second timestamp associated with the second object tracker matches the first timestamp of the first imaging content. The composite imaging content generation module that determine that the second object is in the first imaging content using one or more image analysis algorithms described above. In some embodiments, the composite imaging content generation module may determine that the second timestamp associated with the second object tracker matches the second timestamp of the second imaging content. The composite imaging content generation module that determine that the second object is in the second making content using one or more image analysis algorithms described above. Examples are described with respect to FIG. 1A and FIG. 2A.

Block 608 of the method 600 includes determining that the second device is associated with the second object. For instance, the composite imaging content generation module may determine the second object associated with a second object identifier based on a look-up table stored in a datastore of the aerial vehicle. The composite imaging content generation module may receive the second object identifier and a second device identifier from the second object tracker. The composite imaging content generation module may associate the second object in the first imaging content or the second imaging content with the second device identifier based on the second object identifier. Examples are described with respect to FIG. 1A and FIG. 2A.

Block 610 of the method 600 includes generating a second composite imaging content including the first imaging content or the second imaging content, the second location, and the second object identifier. The composite imaging content generation module may generate a second indicator including the second location and the second object identifier. In some embodiments, in addition to place the first indicator in proximity of the first object in the first imaging content as described above, the composite imaging content generation module may place the second indicator in proximity of the second object in the first imaging content, e.g., a distance between the second indicator and the second object is below the distance threshold such that the second indicator is placed closer to the second object than the first indicator relative to the second object. Additionally and/or alternatively, the composite imaging content generation module may overlay the second indicator with a portion of the second object. In some embodiments, the composite imaging content generation module may place the second indicator in proximity of the second object in the second imaging content, e.g., a distance between the second indicator and the second object is below the distance threshold. Additionally and/or alternatively, the composite imaging content generation module may overlay the second indicator with a portion of the second object. In this manner, the composite imaging content generation module may generate a second composite imaging content including the second indicator. Examples are described with respect to FIG. 1A and FIG. 2A. Block 612 of the method 600 includes sending the second composite imaging content to a user device for presentation. For instance, the composite imaging content generation module may provide and/or create the application interface (or website) that a computing device may access. The computing device may present the second composite imaging content to users who monitor the first object tracker and the second object tracker. The computing device may call one or more active programming interfaces of the composite imaging content generation module using the application interface to receive and present the second composite imaging content and/or associated information (e.g., locations and timestamps associated with one or more object trackers, object identifiers associated with one or more object trackers, etc.). In some embodiments, the computing device may call one or more active programming interfaces of the composite imaging content generation module using the application interface to receive and present the first composite imaging content and the second composite imaging content side-by-side, or in a column. In some embodiments, the composite imaging content generation module may overlay the first composite imaging content with the second composite imaging content. Examples are described with respect to FIG. 1B and FIG. 2A.

Military Applications

An object tracking system as described herein (e.g., the object tracking system 200 in FIG. 2A) may provide relatively more accurate locations compared with conventional GPS positioning techniques, as the object tracking system does not utilize existing GPS networks, but instead uses a nanosatellite-based network of thousands of satellites and algorithms to deliver a cubic-inch geolocation accuracy. Such object tracking systems may be used in various applications, e.g., large-scale combat weapons, covert military and law enforcement operations, commercial and military aviation, drones, transportation, agriculture, livestock tracking, autonomous vehicles, pet tracking, wildlife and marine life tracking, commercial vehicle and capital asset management.

For instance, the object tracking system may be included in weapons for drone warfare deploying large-scale munitions. Typically, most weapons have a circular error probability (CEP) from 2 to 5½ meters for 500-pound class weapons like the Guided Bomb Unit (GBU)-12, -38, -54, -49. The weapons use conventional GPS/INS (an inertial navigation system) for navigation purpose with laser guidance, and typically strike targets with an accuracy of 4.5 to 5 feet. Depending on the construction of the building in different countries, there is a danger of hitting cross beams and other structural barriers, which have caused munitions to deflect from the target. A 500-pound bomb can strike an I-beam, turn 90° and land in the street, a significant concern in urban warfare, particularly in modern countries with potential for civilian casualties. In contrast to the conventional methods, weapons having the object tracking system may strike at a 90° angle on an exact target with a cubic-inch geolocation accuracy. For example, a bomb may strike a specific point on a deck of a ship with an accuracy of the cubic inch. Two or three bombs dropped in succession may be trained on the same cubic-inch target, so that three levels of the ship may be penetrated, into the subfloors reaching a magazine, resulting in sinking the ship via secondary explosions and/or sub-surface detonation.

Figure 7A:
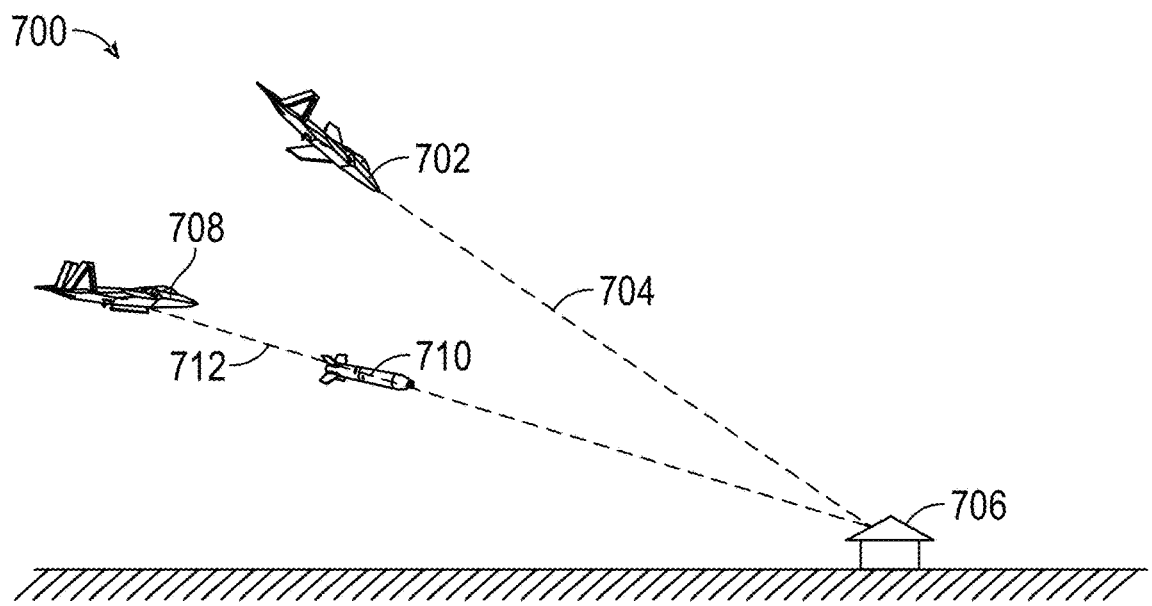
FIG. 7A is a schematic diagram of an example use case illustrating an object tracking system in drone warfare deploying large-scale munitions in accordance with one or more example embodiments of the disclosure.

FIG. 7A is a schematic diagram of an example use case 700 illustrating an object tracking system in drone warfare deploying large-scale munitions in accordance with one or more example embodiments of the disclosure. As shown in FIG. 7A, a first drone or aircraft 702 emits a laser beam 704 to designate a target 706 (e.g., a building). A second drone 708 releases a bomb 710 along a path 712 to strike on the target 706. The bomb 710 may have the object tracking system (e.g., the object tracker system 200 in FIG. 2A) to track positions of the bomb 710. For example, an object tracker may be included in the bomb 710 or may be attached to the bomb 710. The object tracking system may receive satellite signals from one or more GPS satellites, and may determine a current position of the bomb 710 based on the satellite signals. The object tracking system may receive a target position from the first drone or aircraft 702 via a satellite transmission. The object tracking system may calculate a distance between a current positon of the bomb 710 and a target position determined by the laser beam 704. For example, the current positon of the bomb 710 and the target position may be defined in a three-dimensional Cartesian coordinate system or any other suitable coordinate system. The object tracking system may calculate a distance using the coordinates of the current positon of the bomb 710 and the target position. The object tracking system may estimate a destination of the bomb 710 based on the current position of the bomb 710. For example, the object tracking system may input the current position of the bomb 710 into a model (e.g., machine learning model, a neutral network model, or a function indicative of a relationship between the current position and the destination resulting from the current position), and the model may output the estimated destination. The object tracking system may determine a distance between the estimated destination and the target position. For example, the estimated destination may be also defined in the same coordinate system as the target position. The object tracking system may calculate a distance using the coordinates of the estimated destination and the target position. The object tracking system may compare the distance with a distance threshold to determine one or more actions to be performed. A distance threshold may be a distance value or a distance range for determining whether or not a target location determined by laser-guided techniques matches the estimated destination. If the distance exceeds the distance threshold, the object tracking system may determine that a mismatch between the target location and the estimated destination. The object tracking system may determine an adjustment to the current location of the bomb 710. For example, the object tracking system may calculate a difference between the target location and the estimated destination. The object tracking system may generate an updated location for the bomb 710 based on the difference, and the updated location may result in an updated estimated destination that matches the target location. In some embodiments, the object tracking system may use a function indicative of a relationship between a position and a destination resulting from the position to generate the updated location. The object tracking system may communicate with a controller that controls setting parameters (e.g., location, traveling path, and any suitable setting parameters that control the bomb 710) via the satellite transmission to move the bomb 710 from the current location to the updated location. In some embodiments, an object tracker (e.g., the object tracker 210 in FIG. 2A) of the object tracking system may be included in the bomb 710, and a tracking computer (e.g., the tracking computer 240 in FIG. 2A) of the object tracking system may be included in the bomb 710 or the second drone 708. The object tracker or the tracking computer may perform the above destination estimation, distance calculation, comparison, and/or actions.

In some embodiments, the object tracking system may be included in weapons for smaller missiles. Typically, the Air to Ground (AGM)-114 HELLFIRE, or the smaller AGM-176 Griffin, which is only a 13.5-pound warhead like the Javelin, deployed as an air-to-ground asset, at the heart of the envelope has a 1-meter circular error probability (CEP,) requiring an explosive to compensate for that error rate. In contrast to the conventional methods, drones with object tracking system may eliminate one targeted individual, deploying far less expensive inert training bombs about half the cost of the explosive warhead. For example, the targeted individual is driving a vehicle and the people around him are not valid military targets. The object tracking system may enable the weapon to be guided with a laser plus a proprietary data linking technology to strike an exact spot in the vehicle. Combining the object tracking system with a multimode seeker, millimeter wave radar/imaging infrared/semi-active laser, guiding munitions through any weather may enable striking a target with cubic-inch accuracy.

Figure 7B:
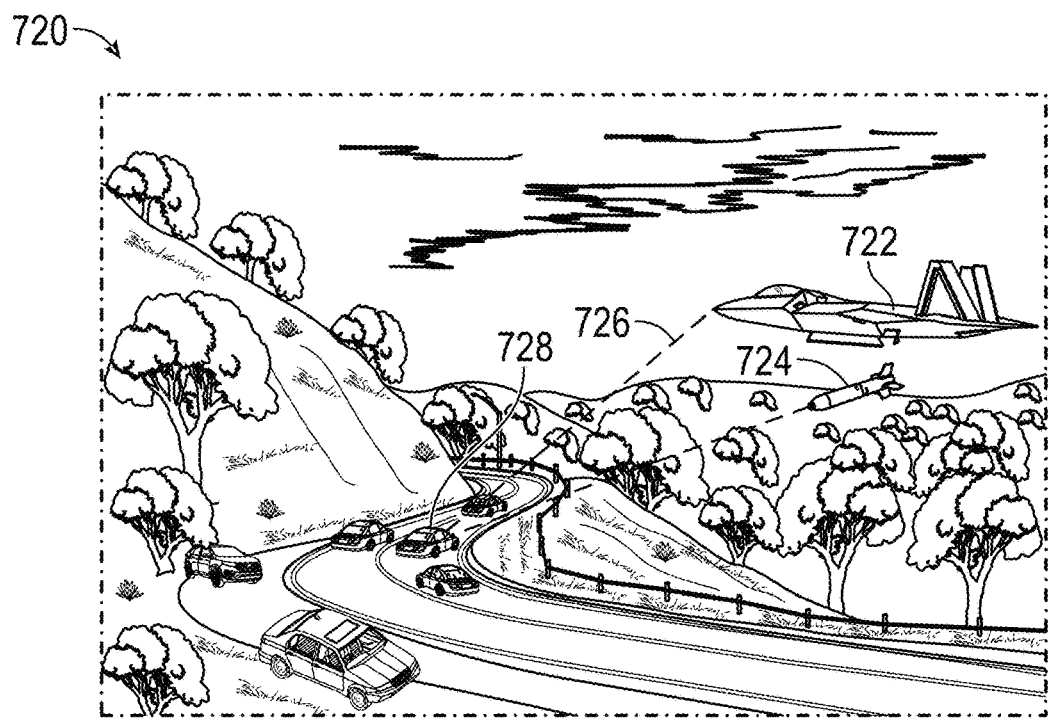
FIG. 7B is a schematic diagram of an example use case illustrating an object tracking system in drone warfare deploying small missiles in accordance with one or more example embodiments of the disclosure.

FIG. 7B is a schematic diagram of an example use case 720 illustrating an object tracking system in drone warfare deploying small missiles (e.g., inert bombs) in accordance with one or more example embodiments of the disclosure.

As shown in FIG. 7B, a drone 722 or an additional drone or device (not shown) that are external to the drone 722 emits a laser beam 726 to designate a target 728 (e.g., a moving vehicle) among other vehicles and/or objects (e.g., people, tree, or any relate objects around the target). The drone 722 releases an inert bomb 724 along a path to strike on the target 728. The inert bomb 724 may have the object tracking system (e.g., the object tracker system 200 in FIG. 2A) to track positions of the inert bomb 724. Similarly to FIG. 7B, the object tracking system may move the inert bomb 724 from a current position to an updated position resulting in the inert bomb 724 striking the target with a cubic-inch accuracy. In contrast, conventional methods and systems provide 1-meter circular error probability (CEP) for small missiles (e.g., the Air to Ground (AGM)-114 HELLFIRE, or the smaller AGM-176 Griffin, which is only a 13.5-pound warhead like the Javelin, deployed as an air-to-ground asset, or any other suitable small-size missiles). Such large CEP may require an explosive to compensate for that error rate. With the object tracking system described herein, drones may eliminate one targeted individual, deploying far less expensive inert bombs about half the cost of the explosive warhead.

Thus, the object tracking system may enhance the GPS with data feeding into the GPS/INS computer for cubic-inch accuracy, beyond the capabilities of the traditional GPS signal. The configuration of tens of thousands of satellites, not just 28 satellites, illustrated with lines of bearing, converging on the object tracking system illustrates a highly accurate elliptical cross-section that enables our one-cubic-inch of accuracy. By adding the object tracking system to existing equipment, with software code changes, instead of a GPS signal as the sole reference data, requiring a targeting laser updating a guidance package on a weapon, the object tracking system may allow the weapon to use pro-navigation to lead the target and maximize its weapon engagement zone (WEZ). The accuracy along with the datalink and a multimode seeker may allow all scenarios on high speed dynamic targets to be routine.

Non-Military Applications

In some embodiments, the object tracking system may be used in non-military applications, such as wireless geo-fencing to enable pet tracking, package delivery drones, agriculture and agricultural equipment, ranching and wildlife tracking, decentralized and additive manufacturing, autonomous vehicles, aircraft safety and navigation, deep sea operations, environmental biometrics, space travel and exploration, and security.

Wireless Geo-Fencing to Enable Pet Tracking

The object tracking system may be used for customizable wireless geo-fencing, unlike conventional methods of invisible fence. Conventional invisible fences have to be permanently installed with no options to move it without digging it up and reinstalling it. It has to be turned on and off. In contrast, the object tracking system may track a position of a pet wearing an object tracker. The object tracking system may obtain a geographical map associated with the position of the pet via a satellite transmission. The object tracking system may overlap the position of the pet with the geographical map to generate a composite map, and the object tracking system may send the composite map to the user device associated with an owner of the pet for presentation. The user device may receive a user input for defining one or more boundaries without using permanently installing the fences used in the conventional methods. For example, the user may simply draw one or more boundaries to define an allowed area on the presented map where the pet is to stay.

The pet is not allowed to stay outside the boundaries. If the pet passes through the boundaries, the object tracking system may send a warning signal to the user device. The object tracking system may also send a shock signal to a vibrator mounted on a collar worn by the pet. The vibrator may produce a shock and/or vibrations at different levels based on a distance between the pet and the boundaries. For example, if the object tracking system determines that a position of the pet is getting further and further away from the boundaries, the object tracking system may control the vibrator to increase strength of vibrations. If the object tracking system determines that the pet is returning back to the allowed area and the position of the pet is getting closer to the boundaries, the object tracking system may control the vibrator to decrease the strength of vibrations.

In some embodiments, with position data (e.g., in three dimensions) captured by the object tracking system, users may set vertical geo-fences to keep cats and other pets from scaling vertical surfaces while the owners are absent, or set limits permanently, for sanitary reasons. For example, the pet is not allowed to go upstairs or jump on the table. One or more object trackers may be placed at a table, an entry to upstairs, and/or any suitable places to define one or more boundaries. The object tracking system may determine locations of the boundaries and track a position of the pet. The object tracking system may determine whether or not the pet passes through the boundaries based on a comparison between the locations of the boundaries and the position of the pet, and send a vibration signal to the vibrator as discussed above. For hunting dogs or search and rescue animals, the object tracking system may identify the top of the animal's head and the rotation of the collar around the body, and the object tracking system may generate vibrations slowly escalating to shock. The object tracking system may function as a "robotic cowboy" so the animal will not know where or why the fences keep changing, but they may be trained to alter behavior based on the vibrations and the anticipated shock. The animals may be trained to specific areas in which they are allowed to roam. With conventional invisible fencing techniques, the animal may escape a defined area and continue roaming as an RF signal of conventional invisible fencing techniques gets weaker. But if the animal goes back to an allowed area, the object tracking system may decrease the shock to essentially herd the animal back to the allowed area.

Figure 8:
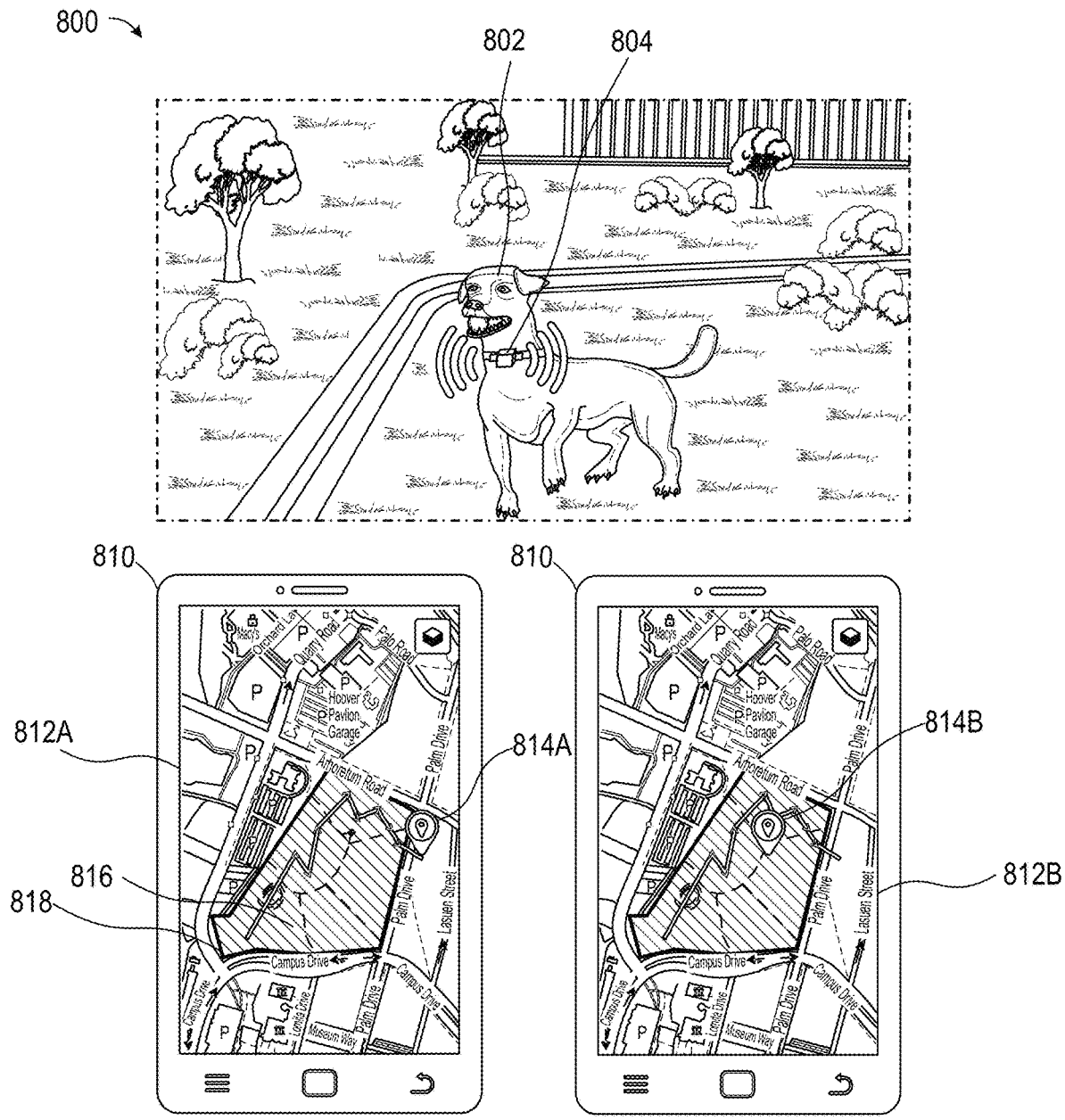
FIG. 8 is a schematic diagram of an example use case illustrating object trackers for wireless geo-fencing in accordance with one or more example embodiments of the disclosure.

FIG. 8 is a schematic diagram of an example use case 800 illustrating object trackers used in wireless geo-fencing in accordance with one or more example embodiments of the disclosure. As shown in FIG. 8, a dog 802 wears an object tracker 804 of an object tracking system (e.g., the object tracker 210(1), the object tracking system 200 in FIG. 2A). The object tracker 804 tracks a current position of the dog 802 based on received satellite signals. The object tracking system may obtain a geographical map associated with a position of the dog 802 via a satellite transmission. The object tracking system may overlap the position of the dog 802 with the geographical map to generate a composite map 812A, and the object tracking system may send the composite map 812A to a user device 810 associated with an owner of the pet for presentation. The user may draw an allowed area 816 via the user device 810 on the composite map 812A where the dog 802 is to stay, or draw a set of boundaries 818 to define the allowed area 816. In some embodiments, the object tracking system may determine a distance between the current positon 814A of the dog 802 and the boundaries 818 using the coordinates of the current position 814A and the boundaries 818, as described above.

The object tracking system may compare the distance with a distance threshold that may be a distance value or a distance range for determining whether or not a current position of an object (e.g., a pet) is located within an allowed area. If the distance exceeds the distance threshold, the object tracking system may determine that a first current position 814A is located outside the allowed area 816. As shown in the composite map 812A, the current position 814A of the dog 802 is outside the allowed area 816. The object tracking system may send a shock signal to a vibrator mounted on a collar worn by the dog 802, and may send a warning signal to the user device 810. In some embodiments, the object tracking system may decrease the shock to essentially herd the dog 802 back to the allowed area 816. As shown in the map 812B, the dog 802 returns back from the first current position 814A to a second current position 814B in the allowed area 816 due to the vibration signal. In some embodiments, an object tracker (e.g., the object tracker 210 in FIG. 2A) of the object tracking system may be located on the collar of the dog 802, and a tracking computer (e.g., the tracking computer 240 in FIG. 2A) of the object tracking system may be included in a remote server (not shown) or may be located on the collar. The object tracker or the tracking computer may perform the above distance calculation, comparison, and/or actions.

Package Delivery Drones

The object tracking system may enable a delivery truck to provide automated dispatch with a robotic arm in the back, loading top-shelf drones. For instance, the delivery truck pulls into a neighborhood area, the drone has its quick flightpath broadcasted to a Federal Aviation Administration (FAA) via Internet protocol via Starlink or other satellite-based Internet reaching the FAA, showing that at an acceptable elevation, at the neighborhood area, launching at current time, the delivery operation is "in the window." Several destinations may be pinpointed with the object tracking system to drop off packages. Residence or commercial locations may have a mini-helipad, attached to an upper story window, enabling precision delivery. Even in a single-story house with a helipad on the roof, another drone can fly up to retrieve the package from the roof. Each house may have its own flightpath within the neighborhood area. If the drone is inside its flight envelope, it is able to take off and its flightpath and battery management is already set with the data link to where the object tracking systems are located. While the drone is launching the next delivery to another house, the data link and precision programming may make the operation possible in areas of limited access internet. For delivery of pharmaceuticals and medical supplies to rural locations, because of obstacles (e.g. quarantine areas or isolated areas), rural locations may have delayed deliveries or must do without. An unmanned drone may deliver medical supplies, prescriptions, medications, contact lenses or supplements, enabling efficient deliveries. Furthermore, tilt-rotor quadcopters may be used to pick up packages and deliver through drone routes prebuilt through the FAA. Each delivery drone has an assigned identifier through the objet tracking system, since facilities may downlink data on each uniquely identified the object tracking system for hardcoded information, registered with the FAA. The assigned identifier identifies each drone and its owner, and it is cleared and dispatched at a post office. It launches, goes to the destination, delivers the package and comes back to the dock, recharges batteries and picks up the next package.

As an example of supplemental data, consider a suburban neighborhood with half-acre lots, with trees and above-ground utilities. Mapped out in the data reference to the drone, the drone may interpret the map data in a 10 nautical mile bubble, managing the computer data on the drone to understand its 3-D environment. Supplementing a 3D environment mapped by light detection and ranging (LIDAR), and radar, the object tracking system may assist the delivery truck as it pulls into the neighborhood, deploys the drones to fly above the trees and power lines, not high enough to affect aircraft, but high enough to fly over the obstacles and fly down the centerline of the actual roads that cars are already occupying, as that airspace has been de-conflicted. The drone enters the property at the mailbox line if the recipient has an established mailbox, otherwise enters at the driveway. The drone flies to its destination known for that address.

Figure 9:
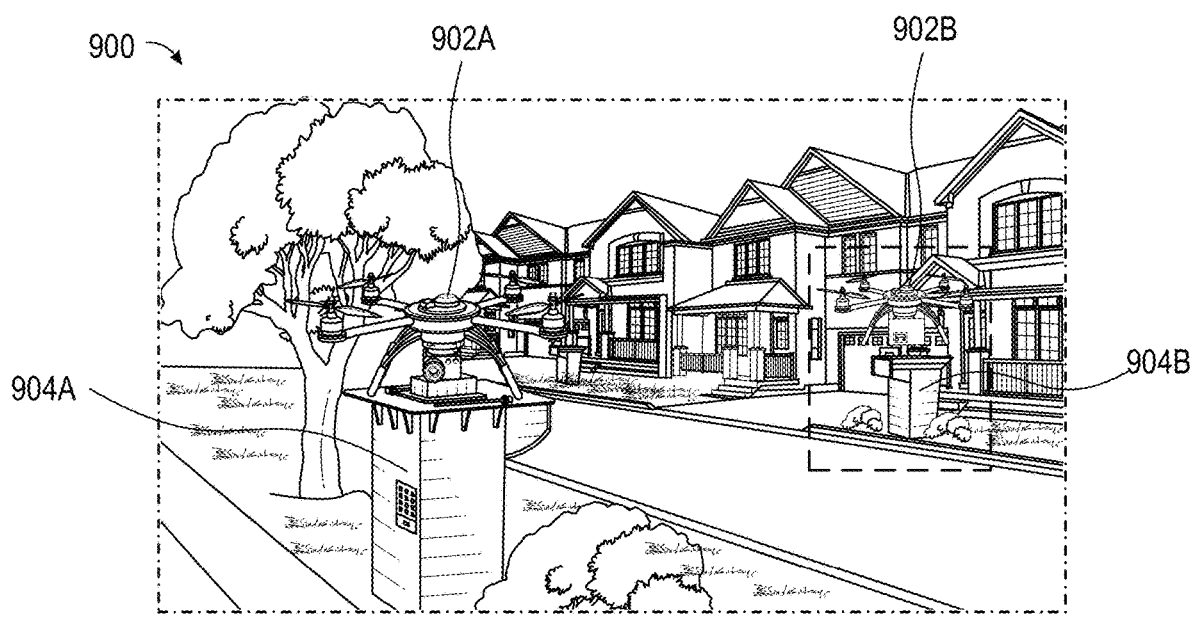
FIG. 9 is a schematic diagram of an example use case illustrating object trackers for package delivery drones in areas of limited access internet in accordance with one or more example embodiments of the disclosure.

FIG. 9 is a schematic diagram of an example use case 900 illustrating object trackers in package delivery drones in areas of limited access internet in accordance with one or more example embodiments of the disclosure. As shown in FIG. 9, drones 902A and 902B each having an object tracker (e.g., the object tracker 210 in FIG. 2A) of an object tracking system deliver packages to established mailboxes 904A, and 904B, respectively. The object tracker of the drone 902A may determine a current position of the drone 902A, and receive a current position of the drone 902B via a mesh network. For example, a first object tracker (e.g., the object tracker 210(1) in FIG. 2B) is attached to the drone 902A, and a second object tracker (e.g., the object tracker 210(2) in FIG. 2B) is attached the drone 902B. The first object tracker may determine the current position of the drone 902A, and the second object tracker may determine the current position of the drone 902B. The first object tracker may receive the current position of the drone 902B via a mesh network (e.g., the mesh network 282). The drone 902A sends the current position of the drone 902A and the current position of the drone 902B to a tracking computer of the object tracking system via a satellite transmission. The tracking computer may be located in a delivery truck (not shown) that dispatches the drones 902A and 902B. The tracking computer may determine a first distance between the current position of the drone 902A and the mailbox 904A. For example, the tracking computer may obtain a position of the mailbox 904A from a database storing the address of the mailbox 904A, and/or from FAA. The tracking computer may obtain the current position of the drone 902A from the object tracker the drone 902A. The tracking system may determine the first distance using coordinates of the current position of the drone 902A and the position of the mailbox 904A, as described above, Similarly, the tracking computer may determine a second distance between the current position of the drone 902B and a position of the mailbox 904B. The tracking computer may compare the first distance and the second distance with a distance threshold. A distance threshold may be a distance value or distance range for determining whether or not a drone enters a landing area associated with a mailbox. For example, if the first distance is less than the distance threshold, the tracking computer may determine that the drone 902A may enter a landing area of the mailbox 904A, and the tracking computer may send a landing signal to the drone 902A.

Agriculture and Agricultural Equipment.

The object tracking system may make large-scale agriculture far more efficient. Inefficient and wasteful crop circles may be replaced with farming in squares, with the assistance of autonomous bots guided by the object tracking system. Conversion from "round farming" to "square farming," may add up to 21% additional growing space and potentially 120% of current yields. The one-cubic-inch accuracy provided by the object tracking system may enable pinpoint aeriation, planting, and irrigation. Regarding irrigation, and the accuracy of the pivots, the object tracking system may enable telescoping to cover the corners. In conventional agriculture equipment, without pinpoint accuracy, the pivots may go out of control, run into roads, barns and other obstacles. Also, with conventional cellular GPS, simultaneous connections are not feasible with dedicated connections that bar any capability for new ones. Video cameras and infrared sensors may be used to determine when crops are ripe so the quality may be maximized, reducing waste and labor costs. Drones may be used to pick up harvested crops and deliver the crops to distributors. In such way, farmers and/or workers may continue their work instead of wasting the transit time to speed the delivery of crops to the distributors. This enables many industries to do 24-hour operations. "Patch plants" that prefer shade may be precision planted in orchards and harvested, in the future, by devices (e.g., robotic devices) in orchards guided by the object tracking system with one-cubic-inch accuracy. The devices guided by the object tracking system may perform precision watering tasks as well as identification of ripe fruit for harvesting. Herds of grazing cattle may be directed into areas such as fields where "patch crops" have been harvested to eat the residual vines and other forage for a layered effect of field maintenance and fertilization.

Figure 10:
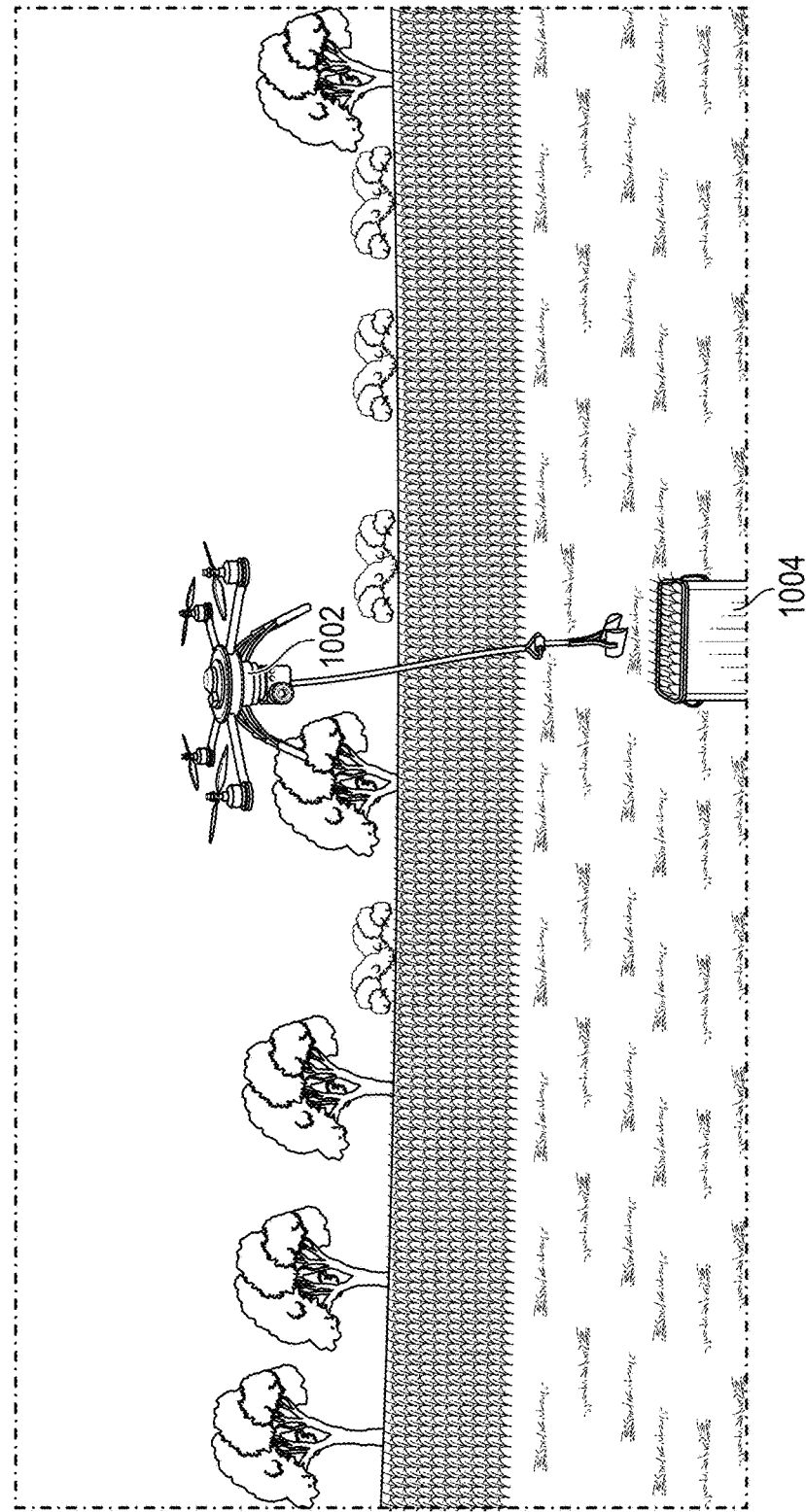
FIG. 10 is a schematic diagram of an example use case illustrating object trackers for autonomous farming in accordance with one or more example embodiments of the disclosure.

FIG. 10 is a schematic diagram of an example use case 1000 illustrating object trackers in autonomous farming in accordance with one or more example embodiments of the disclosure. As shown in FIG. 10, when a container 1004 is reported full, a drone 1002 having an object tracking system (e.g., the object tracking system 200 in FIG. 2A) may pinpoint a site where in the container 1004 is located and deliver the container 1004 to a packing house. For example, an object tracker of the object tracking system may be included in the drone 1002 to track a position of the drone 1002 as described above. The object tracking system may obtain a location of the site from a database storing the location of the sit. Additionally, and/or alternatively, an additional object tracker may be attached to the container 1004 to provide a position of the container 1004. The object tracking system may determine a distance between the drone 1002 and the container 1004 (e.g., using the coordinates of the positions of the drone 1002 and the container 1004). The object tracking system may compare the distance with a distance threshold. A distance threshold may be a distance value or distance range for determining whether or a drone enters an area to pick up a container. For example, if the distance is less than the distance threshold, the object tracking system may determine that the drone 1002 may enter an area to pick up the container 1004.

Ranching and Wildlife Tracking

The object tracking system may be used by ranchers who have leased land from the US Bureau of Land Management for tracking their cattle and monitoring health and wellbeing using the biometrics capabilities and the "man-down" function that can identify an immobile or deceased animal. The object tracking system may also streamline management of fish and wildlife, and monitoring endangered species. For instance, a mobile application may warn users of the presence of endangered species in their area, so that they may maintain proper distance. In a wild environment, the object tracking system may enable tracking the movements of bears, for example during mating season, having cubs, etc. Each collar or implanted device may be adjusted using custom settings for each type of animal being tracked.

Decentralized and Additive Manufacturing

There is also a movement toward more decentralized manufacturing. For instance, 3D printers for subcontracting of fabrication of parts for manufacturing. The object tracking system may enable efficient and quick door-to-door deliveries from small manufacturers to large industrial customers. This opens up the logistics business and enables more subcontractors who are engaged in additive manufacturing to grow their businesses.

Autonomous Vehicles

Autonomous vehicles are currently using two sensors, Radar And Lidar, to plot proximity to other objects, velocity and other factors to automatically apply brakes, swerve to avoid a collision, etc. The object tracking system as a highly accurate GPS, in conjunction with Radar And Lidar, may deliver a triple-redundant system, to upload data via the same satellites on separate channels from each vehicle, so precise cubic-inch-accurate location is identified, including all other vehicles having the object tracking systems in the vicinity. If a third system enabling pinpoint location accuracy can be applied to autonomous driving, every automotive manufacturer will require it. ISO standards require a double-redundancy system, but it is inadequate, as natural occurrences of fog, insects and other system blockers can cause collisions. Actual precise location on the planet is especially important to enable pinpoint monitoring regarding speed and the traffic around each vehicle, their speeds, obstructions, etc. With the object tracking system as the third system in a triple-redundant configuration, autonomous vehicles may plot oncoming traffic over the horizon, anticipating traffic jams or accidents. Further, miniaturized Radar and geo-infrared cameras may be compromised in situations such as snow covering the necessary navigation elements. Using 5 DTED, (digital terrain elevation data) with map data determined by the object tracking system with one-cubic-inch accuracy, where the road is supposed to be may be determined. In the northern tiers, snowplows may accurately keep the road maintained and the cars can stay on that road. And with the object tracking system and Radar, adapting to deep snow coverage by knowing where the road should be enables reporting that back so that inaccurate routes may be corrected. This is an element of machine learning that the object tracking system may contribute to the sum of knowledge required to enable fully automated vehicles.

Illustrative Process for Various Applications

Figure 11:
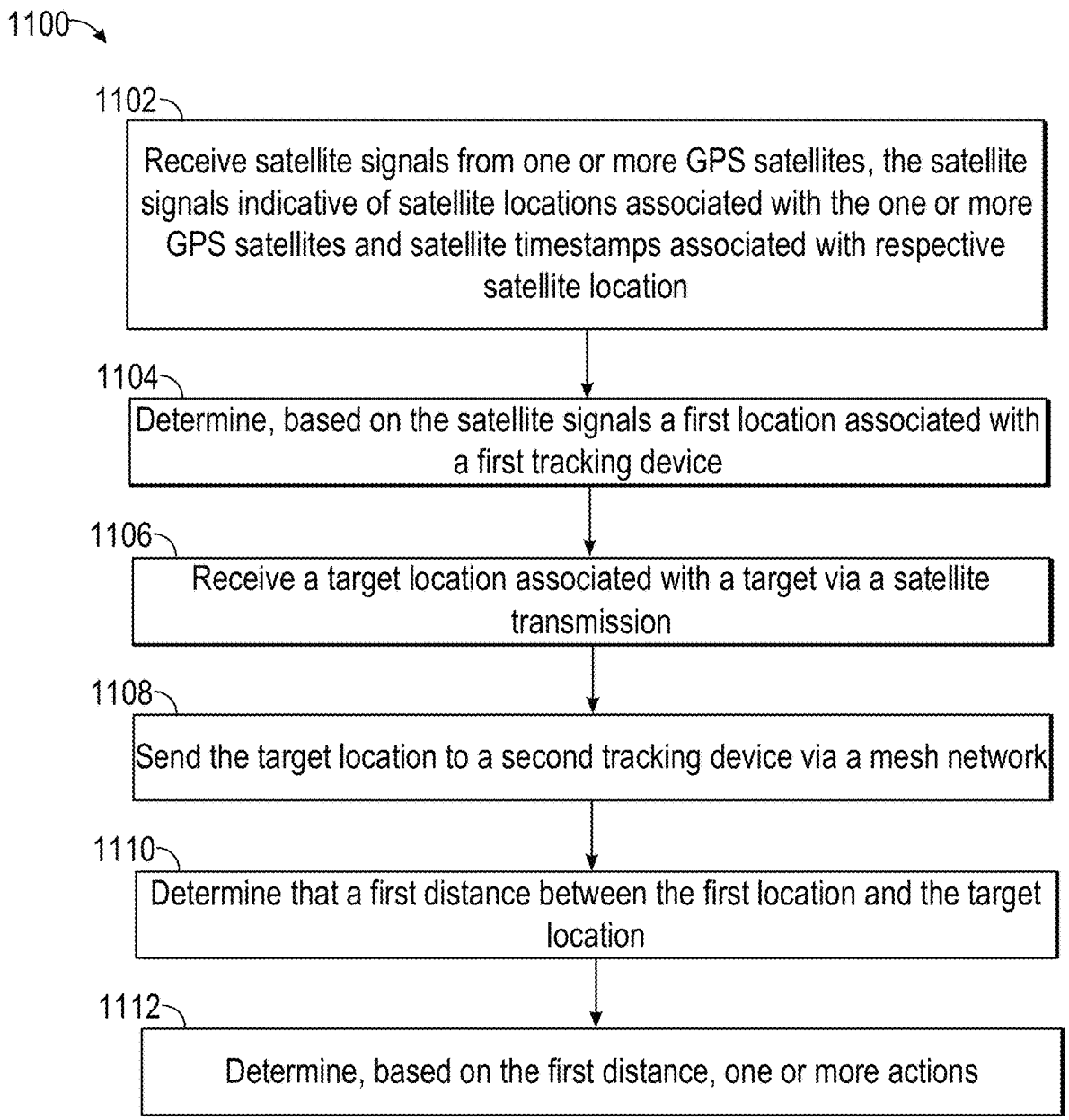
FIG. 11 is an example process flow diagram of an illustrative method of tracking objects in various application in accordance with one or more example embodiments of the disclosure.

FIG. 11 is an example process flow diagram of an illustrative method 1100 of tracking objects in various applications in accordance with one or more example embodiments of the disclosure.

At block 1102 of the method 1100 in FIG. 11, the method includes receiving satellite signals from one or more GPS satellites. For instance, a GPS transceiver of an object tracker may receive satellite locations associated with the one or more GPS satellites and satellite timestamps associated with respective satellite locations. Examples are described with respect to FIG. 2A.

Block 1104 of the method 1100 includes determining, based on the satellite signals, a first location associated with a first tracking device. In some embodiments, a location tracking module of the first object tracker may determine, based on the satellite signals, a first location associated with the first object tracker. Examples are described with respect to FIG. 2A.

Block 1106 of the method 1100 includes receiving a target location associated with a target via a satellite transmission. For example, a target location may be received from any other suitable devices via the satellite transmission (e.g., the satellite transmission 228 in FIG. 2B), such as devices associated with laser-guidance techniques as described with respect to FIGS. 7A and 7B, and image devices as described with respect to FIG. 10. An another example, a target location may be received from a use input such as a predefined set of boundaries as described with respect to FIGS. 8 and 9. In some embodiments, the target location may be received from any other suitable devices via a mesh network. For example, the first object tracker 210(1) may receive the target location from object trackers 210(2)-210(5) via the mesh network 282 as described with respect to FIG. 2B.

Block 1108 of the method 1100 includes sending the target location to a second tracking device via a mesh network. For example, as shown in FIG. 2B, the first object tracker 210(1) may send the target location to the second object tracker 210(2) via the mesh network 282.

Block 1110 of the method 1100 includes determining that a first distance between the first location and the target location. For example, with respect to FIG. 2A, the location tracking module 222 of the object tracker 210(1) may determine that a distance between a location associated with the object tracker 210 and the target location. In some embodiments, the location tracking module 222 of the object tracker 210(1) may determine a distance between a location associated with any other object tracker (e.g., 210(2)-210(10) and the target location. For example, with respect to FIG. 2B, a location associated with the object tracker 210(2) may be sent to the object tracker 210(1) via the mesh network 282. Or a location associated with the object tracker 210(6) may be sent to the object tracker 210(1) via the satellite transmission 228. The location tracking module 222 of the object tracker 210(1) may determine a distance between a location associated with the object tracker 210(1) or 210(6) and the target location. In some embodiments, the tracking computer 240 may include the location tracking module 222.

Block 1112 of the method 1100 includes determining, based on the first distance, one or more actions. For example, if the object tracker (e.g., the location tracking module 222) determines a mismatch between an estimated target location associated with the object tracker and a target location, the object tracker may determine an adjustment to move a current location to a different location. The object tracker may determine that a distance between that location and the target location is less than the first distance. Examples are described above with respect to FIGS. 7A and 7B. In some embodiments, if the object tracker determines that the location is outside an allowed area, the object tracker may send a warning signal to a user device, and send a vibration signal to the object tracker as described with respect to FIG. 8. In some embodiments, if the object tracker determines that the object tracker enters an area associated with the target, the object tracker may send a landing signal to the object tracker, as described with respect to FIGS. 9 and 10.

The operations described and depicted in the illustrative process flows of FIGS. 3-6, and FIG. 11 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 3-6, and FIG. 11 may be performed.

One or more operations of the process flows of FIGS. 3-6, and FIG. 11 may have been described above as being performed by a user device, or more specifically, by one or more program modules, applications, or the like executing on a device. It should be appreciated, however, that any of the operations of process flows of FIGS. 3-6, and FIG. 11 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the process flows of FIGS. 3-6, and FIG. 11 may be described in the context of the illustrative object tracking system, it should be appreciated that such operations may be implemented in connection with numerous other device configurations.

It should further be appreciated that the object tracker 210 may include alternate and/or additional hardware, software, or firmware components beyond those described or depicted without departing from the scope of the disclosure. More particularly, it should be appreciated that software, firmware, or hardware components depicted as forming part of the object tracker 210 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

That which is claimed is:

1. A method comprising:
   receiving, by one or more computer processors, satellite signals from one or more GPS satellites, the satellite signals indicative of satellite locations associated with the one or more GPS satellites and satellite timestamps associated with respective satellite location;
   determining, based on the satellite signals, a first location associated with a first tracking device;
   receiving a target location associated with a target via a satellite transmission;
   sending the target location to a second tracking device via a mesh network;
   determining a first distance between the first location and the target location; and
   determining, based on the first distance, one or more actions.

2. The method of claim 1, further comprising:
   determining an estimated target location based on the first location;
   determining that the first distance exceeds a distance threshold; and
   determining a mismatch between the estimated target location and the target location,
   wherein determining the one or more actions comprises:
      determining an adjustment to move the first location to a third location, wherein a second distance between the third location and the target location is less than the first distance.

3. The method of claim 1, wherein the target location is associated with a predefined set of boundaries, the method further comprising:
   determining that the first distance exceeds a distance threshold; and
   determining that the first location is outside an allowed area;
   wherein determining the one or more actions comprises:
      sending a warning signal to a user device; and
      sending a vibration signal to the first tracking device.

4. The method of claim 1, further comprising:
   determining that the first distance is less than a distance threshold; and
   determining that the first tracking device entered an area associated with the target, wherein determining the one or more actions comprises:
sending a landing signal to the first tracking device.
5. The method of claim 1, further comprising:
receiving a signal indicative of one or more actions associated with the second tracking device via the mesh network; and
sending the signal to a user device via the satellite transmission.
6. The method of claim 1, further comprising:
receiving a second location associated with the second tracking device via the mesh network;
sending the first location and the second location via the satellite transmission;
receiving a third location associated with a third tracking device via the satellite transmission; and
sending the first location, the second location, and the third location to a user device.
7. The method of claim 1, wherein the satellite signals are first satellite signals, and wherein determining the first location associated with the first tracking device comprises:
receiving, from the one or more GPS satellites, the first satellite signals and second satellite signals, the second satellite signals indicative of non-location data;
determining to send the first satellite signals to the first tracking device and the second satellite signals to a memory card;
determining an intermediate location associated with the first tracking device, wherein one or more temporal variable carry with the intermediate location; and
extracting one or more temporal variable from the intermediate location.
8. The method of claim 7, wherein the second satellite signals comprise windspeed associated with the first location, and a temperature associated with the first location.
9. The method of claim 1, further comprising:
determining an activation signal;
mounting, based on the activation signal, a memory card;
storing the first location in the memory card; and
encrypting a signal indicative of the first location.
10. The method of claim 1, further comprising:
determining one or more vital signs associated with an object, the object associated with the first tracking device;
determining that at least one of the one or more vital signs exceeds a safety threshold;
generating a warning signal; and
sending the warning signal to a user device.
11. A system comprising a memory coupled to at least one processor, the at least one processor configured to:
receive satellite signals from one or more GPS satellites, the satellite signals indicative of satellite locations associated with the one or more GPS satellites and satellite timestamps associated with respective satellite location;
determine, based on the satellite signals, a first location associated with a first tracking device;
receive a target location associated with a target via a satellite transmission;
send the target location to a second tracking device via a mesh network;
determine a first distance between the first location and the target location; and
determine, based on the first distance, one or more actions.
12. The system of claim 11, wherein the processor is further configured to:

determine an estimated target location based on the first location;
determine that the first distance exceeds a distance threshold; and
determine a mismatch between the estimated target location and the target location,
wherein determining the one or more actions comprises:
determining an adjustment to move the first location to a third location, wherein a second distance between the third location and the target location is less than the first distance.
13. The system of claim 11, wherein the target location is associated with a predefined set of boundaries, wherein the processor is further configured to:
determine that the first distance exceeds a distance threshold; and
determine that the first location is outside an allowed area;
wherein determining the one or more actions comprises:
sending a warning signal to a user device; and
sending a vibration signal to the first tracking device.
14. The system of claim 11, wherein the processor is further configured to:
determine that the first distance is less than a distance threshold; and
determine that the first tracking device entered an area associated with the target,
wherein determining the one or more actions comprises:
sending a landing signal to the first tracking device.
15. The system of claim 11, wherein the processor is further configured to:
receive a signal indicative of one or more actions associated with the second tracking device via the mesh network; and
send the signal to a user device via the satellite transmission.
16. The system of claim 11, wherein the processor is further configured to:
receive a second location associated with the second tracking device via the mesh network;
send the first location and the second location via the satellite transmission;
receive a third location associated with a third tracking device via the satellite transmission; and
send the first location, the second location, and the third location to a user device.
17. The system of claim 11, wherein the satellite signals are first satellite signals, and wherein determining the first location associated with the first tracking device comprises:
receiving, from the one or more GPS satellites, the first satellite signals and second satellite signals, the second satellite signals indicative of non-location data;
determining to send the first satellite signals to the first tracking device and the second satellite signals to a memory card;
determining an intermediate location associated with the first tracking device, wherein one or more temporal variable carry with the intermediate location; and
extracting one or more temporal variable from the intermediate location.
18. The system of claim 17, wherein the second satellite signals comprise windspeed associated with the first location, and a temperature associated with the first location.

19. The system of claim 11, wherein the processor is further configured to:
  determine an activation signal;
  mount, based on the activation signal, a memory card;
  store the first location in the memory card; and
  encrypt a signal indicative of the first location.

20. The system of claim 11, wherein the processor is further configured to:
  determine one or more vital signs associated with an object, the object associated with the first tracking device;
  determine that at least one of the one or more vital signs exceeds a safety threshold;
  generate a warning signal; and
  send the warning signal to a user device.

* * * * *